INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

June 25, 1968 A. BROTHMAN ET AL 3,390,233

DIGITAL UNAMBIGUOUS CONTROL OF CIRCUIT INTERRUPTER MEANS

Filed Jan. 8, 1965 13 Sheets-Sheet 7

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER

OSTROLENK, FABER, GERB & SOFFEN
ATTORNEYS

PROBABILITY OF ERROR A BIT VS. SIGNAL TO NOISE RATIO FOR THREE TRANSMITTING MODES (AMPLITUDE, FREQUENCY & PHASE MODULATION) WHITE NOISE

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER
OSTROLENK, FABER, GERB & SOFFEN
ATTORNEYS

INVENTORS
ABRAHAM BROTHMAN
MICHAEL GOMERY
CONRAD YANIS
ALLEN MILLER

OSTROLENK, FABER, GERB & SOFFEN
ATTORNEYS

United States Patent Office 3,390,233
Patented June 25, 1968

3,390,233
DIGITAL UNAMBIGUOUS CONTROL OF CIRCUIT INTERRUPTER MEANS

Abraham Brothman, Dumont, Michael Gomery, Saddle River, Conrad Yanis, Glen Rock, N.J., and Allen H. Miller, Laurelton, N.Y., assignors, by mesne assignments, to Sangamo Electric Company, Springfield, Ill., a corporation of Delaware Filed Jan. 8, 1965, Ser. No. 424,347
22 Claims. (Cl. 179—2)

ABSTRACT OF THE DISCLOSURE

A digital transfer trip system which eliminates pilot wire by modulating a phase shift transmitter to provide different code formats, each of which is comprises of data bits, each data bit being comprises of a predetermined number of Nyquist intervals. Receiver means examine the number of Nyquist intervals in each bit to determine ambiguity. Nonambiguous bits are fed to a shift register and logical gate means provide alarms indicated by the code of the bits properly received. If one bit is ambiguous tne shift register is reset, and no larm is generated.

The instant invention relates to communications systems and more particularly to a novel communication means for controlling the operation of protective equipment at one remote location based upon a control signal transmitted from a second remote location, which transmitted signal is generated by an alarm condition at the second remote location wherein the control signal has an extremely low probability of being erroneously generated or received, due to link disturbance conditions.

Communications systems employed in a wide variety of industrial applications quite frequently have extremely stringent operational requirements such that data transmitted from one remote location to another must have extremely high reliability in order to achieve a practical system. As one example in the power transmission field, it is quite typical to find a power transmission line connected at both ends thereof to separate power generating sources. Both ends of such a power transmission line are typically provided with circuit interrupters, each being located in relatively close proximity to one of the power generating sources. In case of a severe overload or fault-current condition at one end of the line, the circuit breaker located at that end is designed to immediately interrupt the current path between the power transmission line and the power generating source closest thereto. In such instances it is quite desirable and usually necessary to provide means for tripping the circuit breaker located near the opposite end of the power transmission line in order to isolate the entire power transmission line during such severe overload or fault-current conditions. Since tansient instantaneous voltage surges on the line occur quite frequently and usually are corrected within a brief time interval, it becomes extremely desirable and usually quite necessary to distinguish between such transient voltage surges and slight disturbances within the power transmission link and between severe overload and fault-current conditions which can do a great deal of damage to the transmission line being protected. During the occurrence of such severe overload or short-circuit conditions it is most important that the circuit breakers at both ends of the power transmission line being protected, be tripped as quickly as possible in order to protect the line from severe damage. The trip signal transmitted must have a clear and unequivocal code format so that it cannot be easily mutilated so as to form another totally different code and further, the quiescent state of the transmitted signal, as well as the test signal which may be employed in such a communications system, must be so different from the alarm signal as to avoid being interpreted as an alarm signal and further must be extremely difficult to be interpreted as an alarm signal even after undergoing changes dues to possible severe disturbauces present in the communications link.

The instant invention provides a novel transfer trip communications system which is designed to send a circuit interrupter trip command to one or more remote stations in accord with a local trip command. A test code can also be sent to verify proper system operation at any given instant. Circuits for monitoring of excessive link noise and loss of channel are also provided.

The instant invention is comprised of a transmitter facility which is made automatically responsive to a signal indicative of the fact that the circuit interrupter associated therewith has initiated a tripping operation. Instantaneously upon the generation of the trip input signal the transmitter facility is provided with a keying stage circuit which controls a transmitting synchronizer circuit to couple one of its plurality of output signals to the transmitter. The transmitting synchronizer circuit is provided with suitable circuit means for generating a quiescent or space condition; a trip signal code format; and a test command code format. One of these code formats is coupled through a logical gating circuit under control of the keying stage for the purpose of modulating a phase shift transmitter circuit with the selected code format. Upon receipt of a trip input signal, the keying stage couples the trip command code format to the frequency shift keying means. In the case where a test sequence is desired, a test push-button provided with as part of the keying stage, when depressed couples the test code format through the logic circuit to the phase shift transmission means. When neither the trip input signal is present, nor the test push-button is depressed, the logic circuit is conditioned to pass the space condition to the phase shift transmission means.

The phase shift transmission means generates a phase modulated carrier at its output in accordance with the input modulating information, namely, the space or quiescent code, the test command code, and the trip command code, as the case may be. The output of the phase shift transmitter circuit passes to a mixer stage which provides an isolated and amplified phase modulated carrier to the communications link. In cases where more than one phase shift transmitter circuit may be provided at a given location, a plurality of inputs may be accepted by the mixer stage for transfer to the communications link.

The communications link employed may be a standard voice guide telephone, carrier or microwave channel. A communications bandwidth of approximately 400–2800 cycles has been found to be quite suitable for the system of the instant invention. The phase shift tone equipment preferably operates at a carrier frequency of 2400 c.p.s., but other carrier frequency rates may be adopted. The keying rate of the system is preferably at the rate of 600 bits per second, but other bit keying rates may be employed.

The receiver facility is comprised of a pair of link input terminals coupling the link to the receiver terminal and is further provided with suitable line matching means between the link input terminals and a phase shift receiver means which receives and demodulates the phase modulated carrier into binary code bits. The code format, which has been received and detected, is impressed upon an analog storage means which generates an analog voltage whose level is representative of the number of Nyquist intervals present within each binary bit. Each received bit is divided into a plurality of Nyquist intervals, each of which interval is examined to establish its oneness, zeroness, or grayness. After each bit has been examined and is clearly identified as a binary zero or binary one, it is loaded into a character register, which is a suitable shift register means, having a bit length equal in length to the code format of either the test command code, the alarm code or the quiescent or space code. Any binary bit, after having been examined, which is identified as being ambiguous or errored, is sensed by a gray bits detection circuit which automatically operates to fully clear the shift register of any binary bits which have been loaded into the register in order to begin a fresh loading operation into the register. The transmitter means, in transmitting a code format repeats the code format many times so that if the first code format transmitted, be it a test code format or an alarm code format, can be examined on the second, fourth, or *n*th time, during which it is transmitted. Ultimately, a code format which is totally unmutilated will be loaded into the shift register means and detected by gating logic as being either the test code format, the trip command code format, or the quiescent code format. Upon loading of an unmutilated test code format, a test lamp will be lit, indicating that the system has received and identified an unambiguous test code transmission. In the case of the trip code format, the gating logic is designed to instantaneously operate relay means, which is coupled in any suitable manner to the circuit interrupter located at the receiver means facility for initiating a trip operation. Upon receipt of a quiescent code format, the gating logic automatically deenergizes the test code lamp and the trip command relay means in readiness for the receipt of subsequent code formats. The receiver facility is so designed that the shift register will continually shift code formats through the register means until the code format transmitted occupies the designated position within the register so as to enable the gating logic for identifying either the trip code command, the test code command, or the space or quiescent code. The code formats are selected so as to be so clearly different from one another as to make erroneous interpretation of one of the codes virtually impossible. The time between transmission of a code format and its unmutilated receipt at the receiver facility normally occurs within a few milliseconds. The system reliability is so high that when operating at a speed of 600 bits per second transmission rate, approximately $2\times10^9$ characters are transmitted per year with a chance of only one in 1000 of an error of evasion over a one year period. At a signal-to-noise ratio of 10, the probability of an error is less than $10^{-5}$ and the probability of an error of evasion is less than $10^{-20}$.

It is therefore one object of the instant invention to provide novel means for use in a communications system capable of transmitting and receiving code information between two remote locations in which the probability of receiving errored information is extremely small.

Another object of the instant invention is to provide a novel transfer trip system for use in the protection of power networks and the like wherein trip signals may be transmitted between two remote locations over extremely brief time intervals in which the reliability of receipt of a valid code format at the receiver facility is extremely high.

Still another object of the instant invention is to provide a novel transfer trip communication system for use in the protection of electrical power networks and the like in which an extremely reliable communications link is provided through the use of a novel gray bits detection means greatly enhancing system reliability without any change in the communications system code format, or bit transmission rate.

Another object of the instant invention is to provide a novel transfer trip communications system employing means for examining the Nyquist intervals of each receive binary bit thereby adding error correction and error detection capabilities to the communications system without any changes whatsoever in bit transmission rate and/or code format.

Still another object of the instant invention is to provide a transfer trip communications system employing a novel means for examining the Nyquist intervals of incoming data bits comprising means for generating an analog voltage which accumulates a voltage level representative of the voltage levels within each Nyquist interval and having an adjustable threshold means for determining the oneness, zeroness, or grayness of each bit received.

Still another object of the instant invention is to provide a transfer trip communications system employing a novel means for examining the Nyquist intervals of incoming data bits comprising means for generating an analog voltage which accumulates a voltage level representative of the voltage levels within each Nyquist interval and having an adjustable threshold means for determining the oneness, zeroness, or grayness of each bit received and further providing means for developing a link history of the communications system useful in evaluating the status of incoming bit information.

These and other objects of the instant invention will become apparent when reading the accompanying description and drawings in which.

Figure 11:
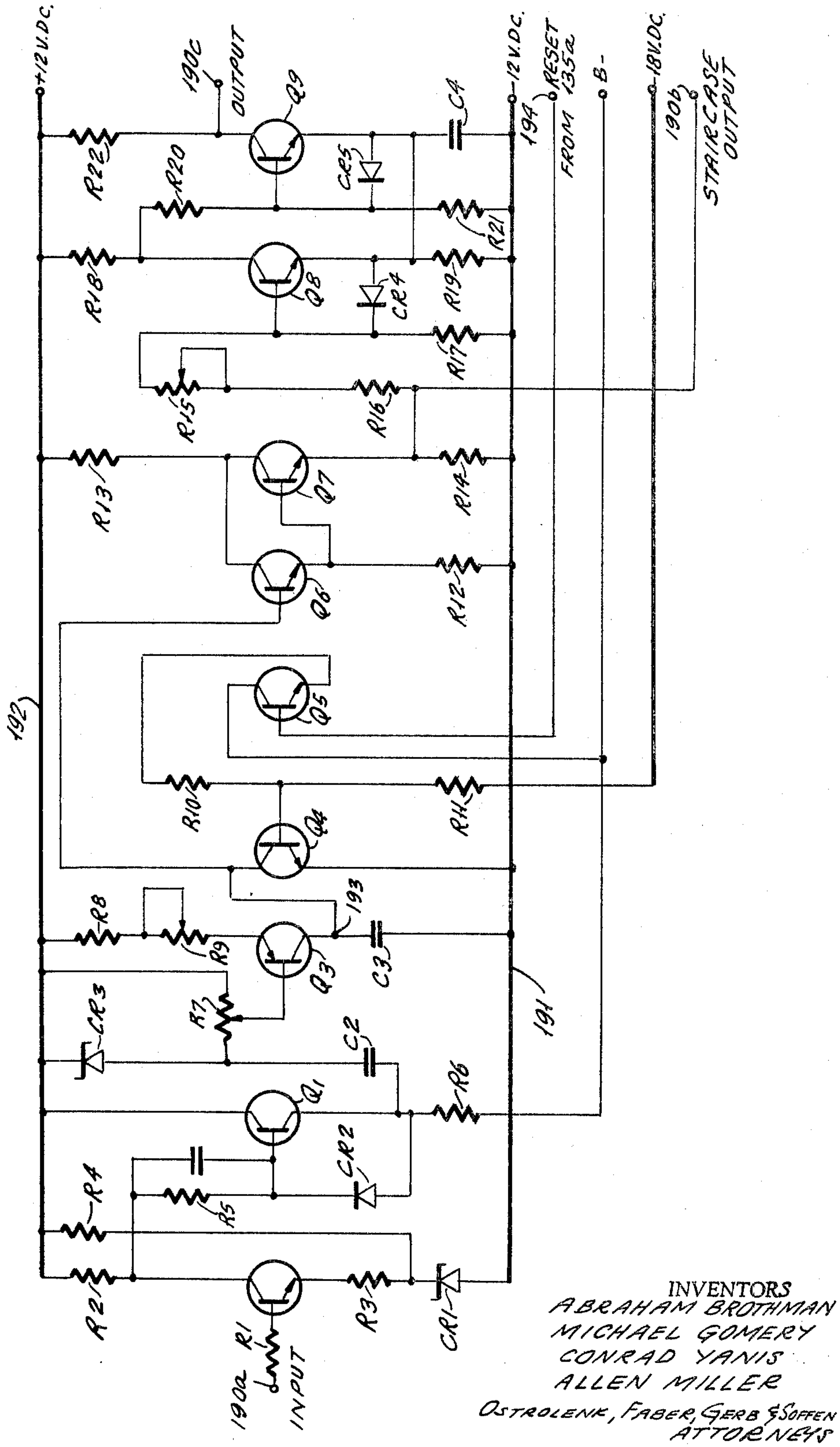
FIGURE 11 is a schematic diagram showing the staircase generator employed in the receiver facility of FIGURE 3.
Figures 12, 12A:
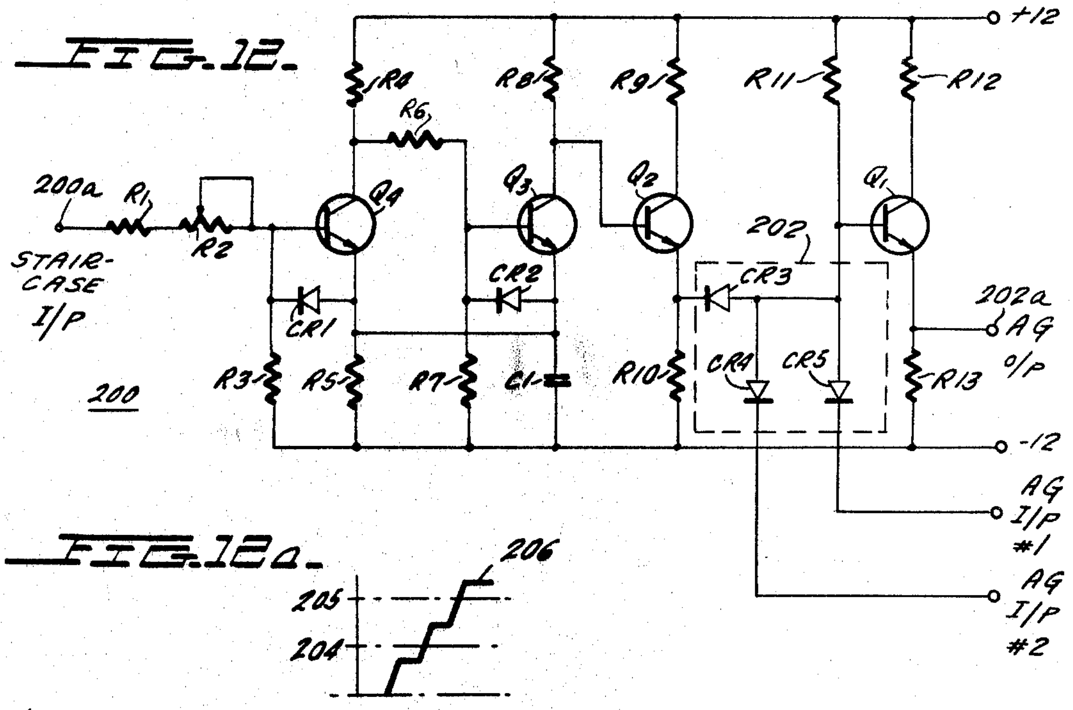
FIGURE 12 is a schematic diagram of the gray bits detector circuit employed in the receiver facility of FIGURE 3.

FIGURE 12*a* is a waveform representative of the charging of the storage means in the staircase generator circuit of FIGURE 11.

Figure 3:
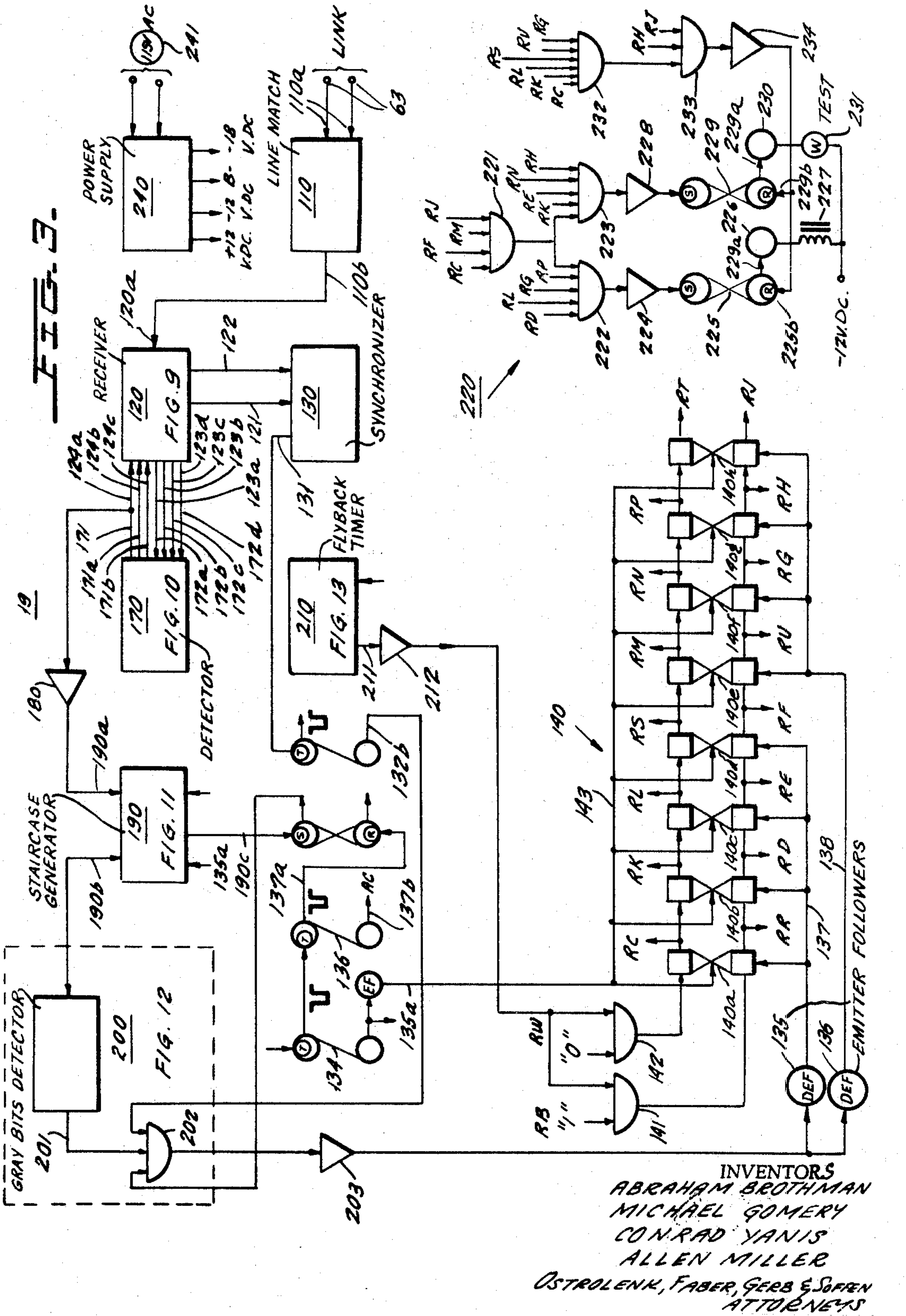
FIGURE 3 is a block diagram showing the receiver facility of FIGURE 1 in greater detail.
Figure 13:
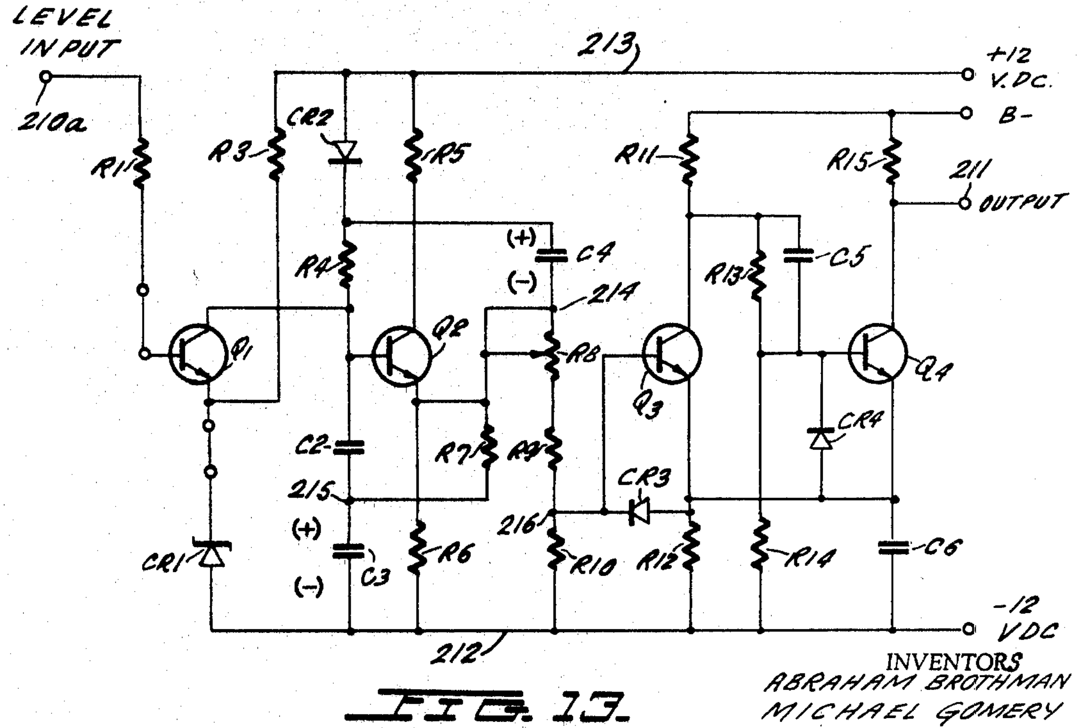

FIGURE 13 is a schematic diagram showing the flyback timer employed in the receiver facility of FIGURE 3.

Figure 14A:
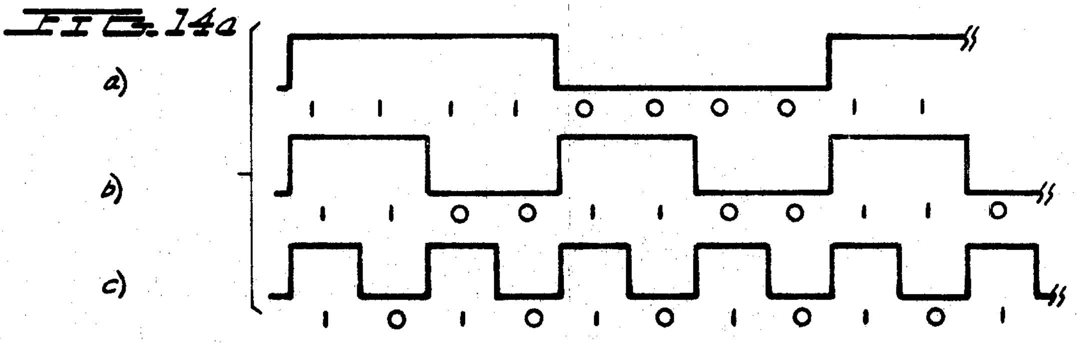
Figure 14B:
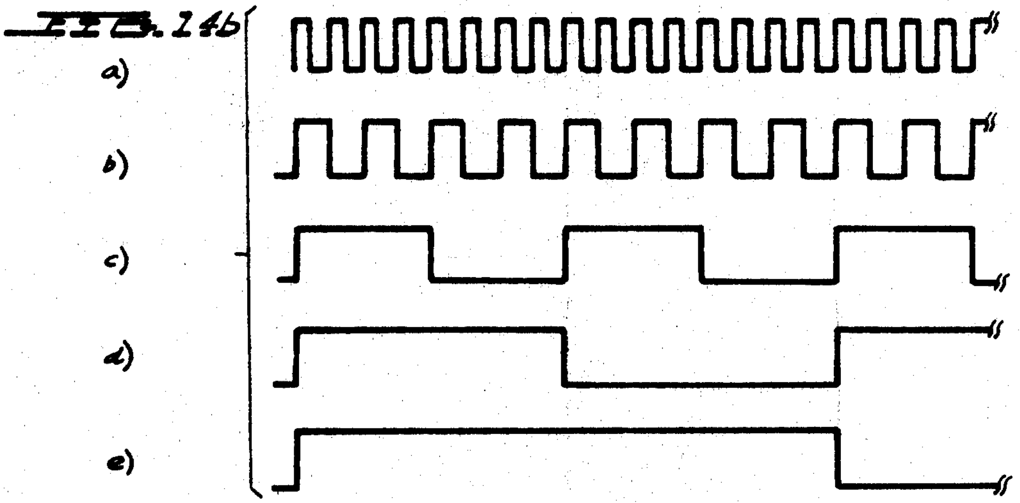

FIGURES 14*a* and 14*b* are waveforms showing the code formats of the instant invention and the manner in which they are formed.

FIGURES 15*a*–15*h* are waveforms showing the manner in which transmitted data is received and interpreted through the use of the Nyquist examination means of the instant invention.

FIGURE 16 is a chart showing the probability of a bit error vs. signal to noise ratio for three transmission modes.

Figure 1:
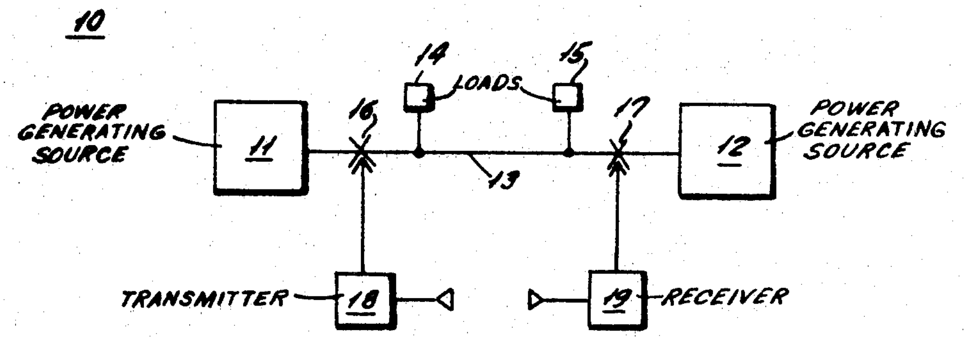
FIGURE 1 is a block diagram of a transfer trip communications system designed in accordance with the principles of the instant invention.

Referring now to the drawings, FIGURE 1 shows a power transmission network 10 in which the transfer trip system of the instant invention is employed. As shown therein, the power transmission network 10 is comprised of first and second power generating sources 11 and 12, respectively, feeding a transmission line 13, which may service a plurality of loads such as the loads 14 and 15 connected to the power transmission line. Automatically operated circuit interrupters 16 and 17 are positioned in relative close proximity to the power generating sources 11 and 12, respectively, serving the functions of protecting the power generating sources against damage, as well as protecting the transmission line 13 against any damage which may occur, due to severe overload or fault-current conditions by isolating the generating sources from the transmission line upon the occurrence of overload and fault-current conditions. While other sections of the transmission line 13, as well as the sources 14 and 15 may be protected by other automatic circuit interrupting devices, such additional devices have been omitted from this figure for the purposes of simplicity.

Let it be assumed that a fault occurs at or near one end of the transmission line. For example, near the end which is fed by the generating source 11. If the fault is of such a nature as to be severe enough to automatically operate the circuit interrupter 16, it becomes extremely important to isolate the entire transmission line 13 to be performed by the transfer trip device of the instant invention.

The circuit interrupter 16, in addition to initiating an interrupting operation by sensing a fault condition, further generates a signal to condition the transmitter facility 18 in order to generate the trip command code format and transmit this code format to the receiver facility 19 located adjacent the generating source 12 and near the opposite end of the power transmission line 13. Upon successful error free reception of the trip command code format, the receiver facility 19 provides a signal suitable to operate the circuit interrupter 17 in order to completely isolate power transmission line 13 from its generating sources 11 and 12. In addition to providing superior error detection and correction capabilities without any change whatsoever in code format or in bit transmission rate, the system is capable of transmitting the trip command format, receiving it successfully at the opposite end of the transmission line, and initiating a tripping operation of the circuit interrupter at the opposite end of the line within time durations of the order of three or four milliseconds.

In a like manner, the transmitter and receiver facilities 18 and 19 may be accompanied with receiver and transmitter facilities respectively, so as to permit two-way operation of the system in cases where a fault may occur near the power generating source 12 requiring an isolation between the power generating source 11 and the opposite end of line 13.

In addition to transmission of the trip command code format, the system is also provided with means to transmit a test code which may be sent periodically to verify proper system operation. In addition thereto, when the system is in the rest condition, i.e., when no control signals are being transmitted, the output of the tone transmitter is in its rest phase, which can be designated as a Space condition. As shown in FIGURE 14*a*, waveform *a* designates the Space condition which condition is the code 11110000.

When a trip command is being sent the transmitter is keyed so as to develop an output designated by the waveform *b* of FIGURE 14*a*, which is a code 11001100. This code is continually repeated at the transmitter end until the trip command signal from the circuit interrupter 13 returns to normal.

When a test command code format is transmitted, this format is designated by the waveform *c* of FIGURE 14*a* which is comprised of a continuous stream of alternate binary ones and zeros, as shown by waveform *c*. The test command code format is transmitted as long as the test push-button, to be more fully described subsequently, is depressed. Each remote station designed to receive the code formats from the transmitting facility, receives the output of its associated tone receiver, to be more fully described, and loads the information into memory, and continuously examines each received bit in the decoder means, to be described. The successful un-errored receipt of the code 10101010 results in the generation of a test signal at the receiver facilities. The receipt of the code 11001100 results in the generation of a trip command signal at each facility designed to receive this code. The receipt of any other eight-bit code format results in a "link noisy" indication. The codes have been selected for their simplicity, as well as for their ability to be clearly distinguished from one another.

SYSTEM SECURITY

The security of any coding system is given by the probability of an undetectable error —$P_{CEE}$. The probability of such an undetectable error (error of evasion) is always of the form $$P_{CEE}=cp^d,\ 0<C\leqslant b/(d)$$

where *c* is a constant, *p* is the probability of a bit error, *d* is the codes distance, and *b* is the number of bits in the code. The distance of a code is the minimum number of bit positions in which any two characters differ. In this system, only three valid codes are used. These are:

11110000—base condition
11001100—trip
10101010—test

It is apparent that four errors are required to change the base information on the link into a trip or test command, and that these four errors must occur in a unique fashion. Thus: $P_{CEE}=1p^4$. FIGURE 16 is a plot of the probability of erroring a bit due to white noise vs signal-to-noise ratio for the three types of tone equipment. It is apparent that, at the bit level, phase shift equipment provides the greatest security. Referring to the curve at a signal-to-noise ratio of 7.5 (which is indicative of extremely poor and rarely encountered link conditions), we find $P_e$ to be $1.2\times10^{-3}$. Then $P_{CEE}=p^4=2.1\times10^{-12}$. At the operating speed of 600 bits per second, approximately $2\times10^9$ characters are transmitted per year. Thus, there is only a 1 in 1000 chance of an error of evasion per year. At a signal-to-noise ratio of 10, $P_e$ is less than $10^{-5}$ and $P_{CEE}$ is less than $10^{-20}$. Thus, the probability of false tripping due to link noise is indeed low.

Figure 2:
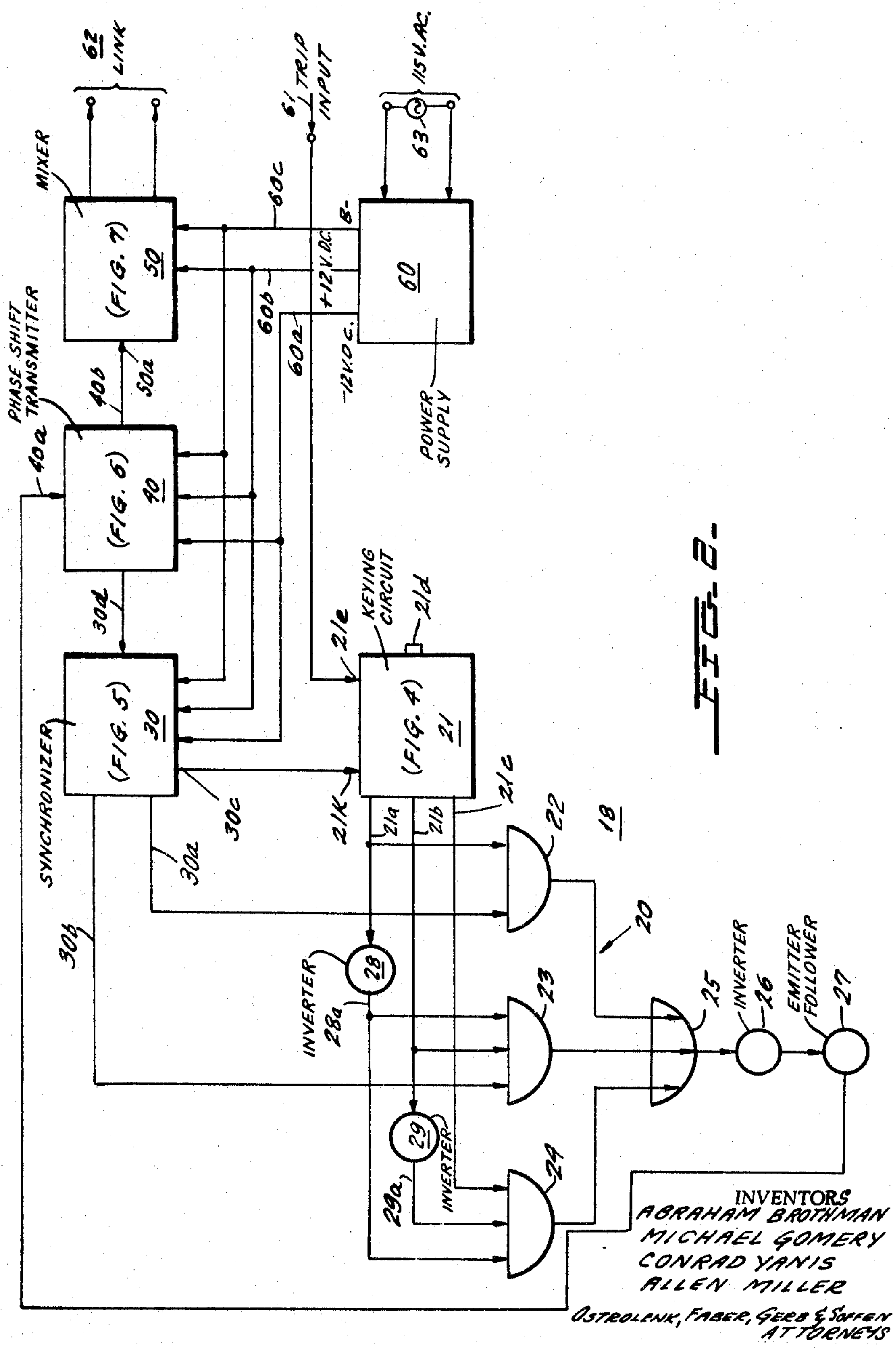
FIGURE 2 is a block diagram showing the transfer trip transmitter facility of the system of FIGURE 1 in greater detail.

FIGURE 2 shows the transmitter facility 18 of FIGURE 1, in greater detail. The transmitter facility 18 is comprised of a transmitter synchronizing circuit 30, which is adapted to generate the trip command code format at its output 30*a* and the test command code format at its output 30*b*. The decision as to which code format, i.e., trip command, test command, or quiescent state formats are to be transmitted, is controlled by the keying stage circuit 21 which selectively enables and/or inhibits the logical Gating circuitry 20 to determine which of the command formats are passed by the logical Gating circuitry to the control input 40*a* of phase shift transmitter circuit 40. The selected code format is impressed upon the input terminal 40*a* for employment as the modulating source of the carrier frequency to be transmitted. Modulation in the exemplary embodiment is in the form of phase shift modulation. While a phase shift transmission and reception system is preferred, from the viewpoint of reliability and low probability of erroring, it should be understood that other modulating systems such as, for example, frequency shift or amplitude modulation may be employed. The modulated carrier appears at the output 40*b* of the phase shift transmitter facility and is impressed through a mixing stage circuit 50 to the terminals of the communications link 62. All of the circuits 21, 30, 40 and 50 are powered by a suitable power supply source 60 which develops D.C. voltages, preferably at the levels of −12 volts, +12 volts and *b*− at its output terminals 60*a*–60*c*, respectively, and in turn, receives its energy preferably from a 115 volt A.C. source 63.

The operation of the transmitter facility 18 is as follows: When input terminal 61, which is connected to the output of the circuit interrupter device 16 of FIGURE 1, receives a trip signal which is preferably a −125 volt D.C. input, this level is impressed upon the input terminal 21*e* of the keying stage circuit 21, to provide a 12 volt keying control signal at its output terminal 21*a*. This output terminal, which was previously at −11 volts D.C., makes a transition to −1 volt D.C. indicative of a tripping action. The −1 volt D.C. level is the binary one level which is impressed upon one input of AND gate 22. The other input of AND gate 22 is connected to output 30*a* of the transmitter synchronizing circuit 30 which generates the trip command code format. This code format is thus enabled to pass through AND gate 22, OR gate 25, Inverter circuit 26, and the emitter follower 27, to the keying input 40*a* of the phase shift transmitter 40.

Simultaneously therewith the binary one state at output terminal 21*a* of keying circuit 21 is inverted through Inverter circuit 28 to a binary zero level at its output 28*a*. This binary zero level is impressed upon one input terminal of both AND gates 23 and 24 to inhibit these AND gates from passing any code signal through to the modulating input terminal of the phase shift transmitter 40. Thus, only the trip command format is enabled to modulate the carrier frequency.

In the case where no abnormal condition exists on the line, and it is desired to initiate test command operation, the test push-button 21*d* is depressed, causing a binary one output to develop at the output terminal 21*b*. This impresses a binary one state upon one input of AND gate 23. Since keying stage 21 has not received a trip input signal at this time, its output 21*a* is at the binary zero state. This inhibits AND gate 22 from passing the trip command code format to the phase shift transmitter facility. A Binary zero state is inverted through circuit 28 which develops the binary one at its output 28*a* to impress binary ones upon input terminals of AND gates 24 and 23. AND gate 23 thereby has two binary one inputs at its middle and right-hand input terminals, enabling the output at terminal 30*b* of the transmitting synchronizing circuit 30 to be passed through AND gate 23, OR gate 25, Inverter 26 and emitter follower 27 to the modulating input 40*a* of phase shift transmitter 40.

The binary one output at terminal 21*b* of keying stage circuit 21 is inverted by Inverter circuit 29, which thereby generates a binary zero at its output 29*a*, thus inhibiting AND gate 24 from passing any signal therethrough. Thus, during the test command operation, AND gates 22 and 24 are inhibited, or blocked, from passing any signal, while AND gate 23 passes the test command code format to the phase shift transmitter. It should be understood that the test command code format will continuously be imposed upon the modulating input terminal 40*a* of phase shift transmitter 40 as long as the test push-button is depressed. In a like manner, the trip command code format, when a trip command state is initiated, will continue to be impressed upon the phase shift transmitter until the error transmission system being protected returns to its normal state.

In the case where the system is in a rest condition, that is, where neither a test command nor a trip command code format is being transmitted, the outputs 21*a* and 21*b* of keying stage 21 are in binary zero state, while its output 21*c* is at binary one state. It should be noted that output 21*c* is always in binary one state. The binary zero outputs at terminals 21*a* and 21*b* are inverted to binary one states by Inverter circuits 28 and 29, respectively, impressing binary one states upon two inputs of AND gate 24. The remaining input receives a binary one state from output terminal 21*c*, passing a binary one state through OR gate 25 to the input of Inverter 26. Inverter 26 inverts the binary one state to binary zero and impresses this binary zero, or space condition through emitter follower 27 upon the modulating input terminal 40*a* of phase shift transmitter 40. Output terminal 21*a* of keying stage 21, being binary zero, inhibits AND gate 22. Output terminal 21*b* of keying stage 21, being at binary zero, inhibits AND gate 23. Thus, during a rest, or quiescent operating state, binary zero is continuously impressed upon the modulating input terminal 40*a* of phase shift transmitter 40.

Figure 4:
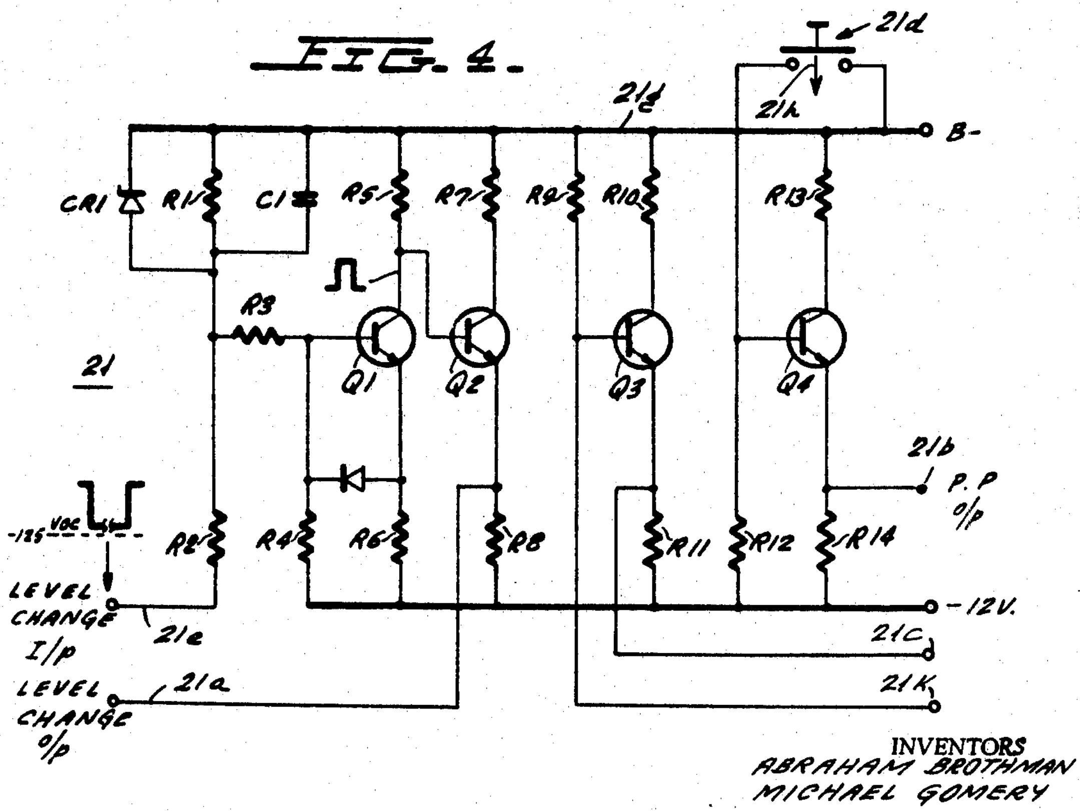
FIGURE 4 is a schematic diagram of the transmitter facility keying stage shown in FIGURE 2.

FIGURE 4 is a schematic diagram of the keying stage 21, shown in FIGURE 2. When input terminal 21*e* receives a −125 volt level, this causes a −12 volt D.C. to be impressed upon the base electrode of transistor Q1, by action of Zener diode CR1, causing it to go into cut-off state. This drives its collector electrode toward the B− potential of B− bus 21*g*. This level is imposed upon the base electrode of transistor Q2, driving it into saturation and causing a voltage to appear across resistor R8 so that the emitter electrode of transistor Q2 goes to approximately −1 volt D.C. This voltage level appears at the output terminal 21*a*, to be imposed upon the gating circuit 20 in the manner previously described.

In order to initiate a test command code format, the push-button 21*d* is depressed in the direction shown by the arrow 21*h*, causing the base electrode of transistor Q4 to go to the B− level. This causes transistor Q4 to saturate, developing a voltage across resistor R14 of approximately −1 volt D.C., which is defined as the binary one level. This appears at the output terminal 21*b*, to be imposed upon the gating circuitry 20 in the same manner as previously described.

In the quiescent, or rest state, of the transmitter facility, input terminal 21*k* connected to output terminal 30*c* of the transmitter synchronizer circuit 30, receives a binary one level input which is coupled to the base electrode of transistor Q3. This causes a voltage to develop across resistor R11, causing the −1 volt D.C. or binary one level to appear at the output terminal 21*c*. It should be noted that each of the individual states within keying stage circuit 21 is completely independent of the other so as to freely receive trip command, test command and rest state signals without any interaction occurring between and among these circuits. Returning to FIGURE 2, it can be seen that the gating circuitry arrangement 20 gives priority to trip command signal since as soon as the trip command output terminal 21*a* goes to binary one, this terminal being coupled through Inverter 28 to AND gates 23 and 24, automatically inhibits these AND gates, permitting only the trip command code to be passed to the phase shift transmitter 40. Thus, even though independent operation of the individual circuits within the keying stage may occur, priority of the signals are clearly established through the gating arrangement 20 shown in FIGURE 2.

Figure 5:
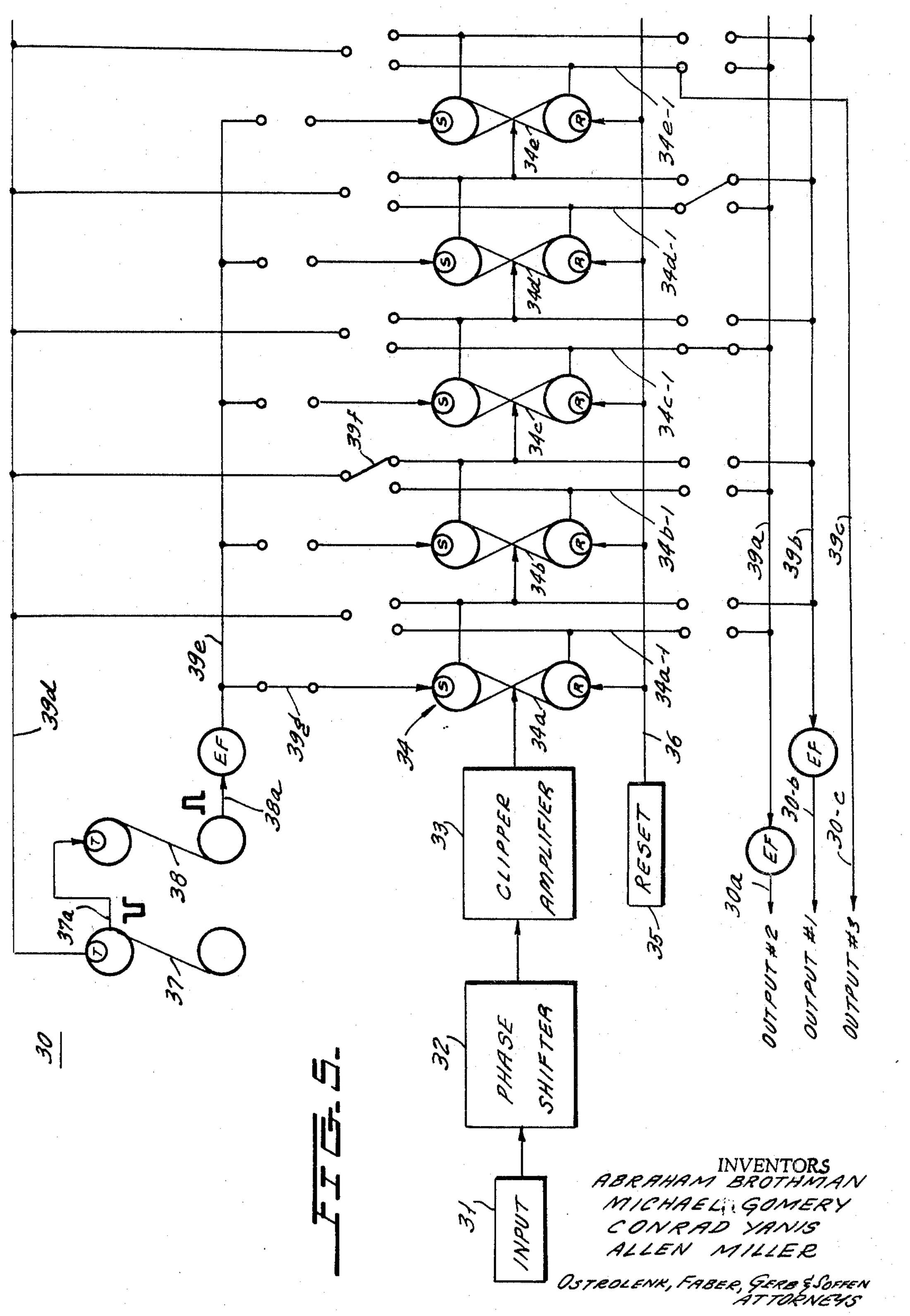
FIGURE 5 is a schematic diagram of the transmitting synchronizer employed in the transmitter facility of FIGURE 2.

FIGURE 5 shows a schematic diagram of the transmitting synchronizer 30, which is comprised of an input clock source 31, having a clock rate which is some integral multiple of the binary bit transmitting rate. The clocking source output is impressed upon a phase shift circuit 32 of any suitable design so as to establish the appropriate phases at its output in order to attain system synchronism. The phase shifter output is impressed upon a clipper amplifier circuit 33 so as to impress substantially sharp square pulses upon the input of a multi-stage dividing circuit 34, comprised of flip-flop stages 34*a*–34*e*, respectively. The multi-stage dividing circuit 34 is so designed as to divide the output of the clipper amplifier wave train, dependent upon the number of stages provided in the dividing circuit 34. In the case of the embodiment shown in FIGURE 5, wherein five flip-flop stages are provided, the input waveform will be divided by two at the first stage, four at the second stage, eight at the third stage, sixteen at the fourth stage and thirty-two at the fifth stage. Turning to FIGURE 14*b*, there is shown therein the waveforms *a*–*e*. Waveform *a* shows the square pulse train emanating from clipper amplifier circuit 33 and impressed upon the input of bistable flip-flop 34.

The operation of the transmitting synchronizer circuit is as follows:

The local clock source develops the carrier frequency sine wave which is the reference wave for this system. This sine wave is impressed upon phase shifter 32, which determines the phase relationship between the keying signals to be developed and the carrier waveform, in order to establish when the square wave transitions will occur relative to the reference sine wave of this system. After suitable phase shift the phase adjusted sine wave is impressed upon clipper amplifier 33 which develops the output shown by waveform *a* of FIGURE 14*b*. Reset means 35 impresses a reset pulse upon the reset input terminals of each of the flip-flop stages 34*a*–34*e*, through bus 36. The square wave shown by waveform *a* of FIGURE 14*b* is impressed upon the input of first flip-flop stage 34*a* and is divided by two at its output 34*a*–1. The output of first stage 34*a* is impressed upon the input of second stage 34*b*, whose output 34*b*–1 divides the square wave by two again. The third stage 34*c* divides the output by two again and this is shown by waveform *c* of FIGURE 14*b*. Ultimately, the output terminals 34*d*–1 and 34*e*–1 of stages 34*d* and 34*e* develop the square wave pulse train shown by waveforms *d* and *e* of FIGURE 14*b*. Output terminal 34*c*–1 is coupled through bus 39*a* to output terminal 30*a* of transmitter synchronizer 30. In a like manner, the output terminals 34*d*–1 and 34*e*–1 are coupled to buses 39*b* and 39*c*, respectively, so as to appear at output terminals 30*b* and 30*c*, respectively. Thus, the three code formats shown by waveforms *c*, *d* and *e* of FIGURE 14*b* are thereby generated. It should be understood that a greater or lesser number of stages may be employed in order to provide lesser or greater numbers of divisions.

In cases where it is desired to divide by other than $2^n$, the transmitting synchronizer 30 is further provided with buses 39*d* and 39*e*, with bus 39*d* having a number of tie-points positioned in close proximity to the first and second outputs of each of the flip-flop stages 34*a*–34*e*. Let it be assumed that output terminal 34*b*–2 of flip-flop stage 34*b* is tied at 39*f* to bus 39*d*. Just as soon as output terminal 34*b*–2 goes positive, a positive square pulse passes from output terminal 34*b*–2 through connection 39*f* and bus 39*d* to the trigger input terminal of a one-shot multivibrator 37. The output of multivibrator 37 develops a negative square pulse at its output terminal 37*a*. When this square pulse goes positive at its trailing edge, this triggers the input terminal of a second one-shot multivibrator 38 which generates a positive square pulse at its output terminal 38*a*. This is impressed upon the set input terminal of first flop-flop stage 34*a* through bus 39*e* and connection 39*g* to add an additional pulse to the count, thereby providing a division of the input square pulses, shown by waveform *a* differing from a $2^n$ division. By selecting the connections between the output terminals of each flip-flop stage and bus 39*d* and between the set input terminals of the flip-flop stages and bus 39*e*, any desired division of the square pulse waveform *a* of FIGURE 14*b* can be obtained. Thus, the capability of the system makes it sufficiently flexible to adjust to any operation desired. The waveforms *c*, *d* and *e* of FIGURE 14*k*, appearing at the output terminals 30*a*, 30*b* and 30*c*, respectively, represent the trip command, test command and rest command code formats, respectively. It should be understood that these waveforms are repetitive and are continuously generated.

Figure 6:
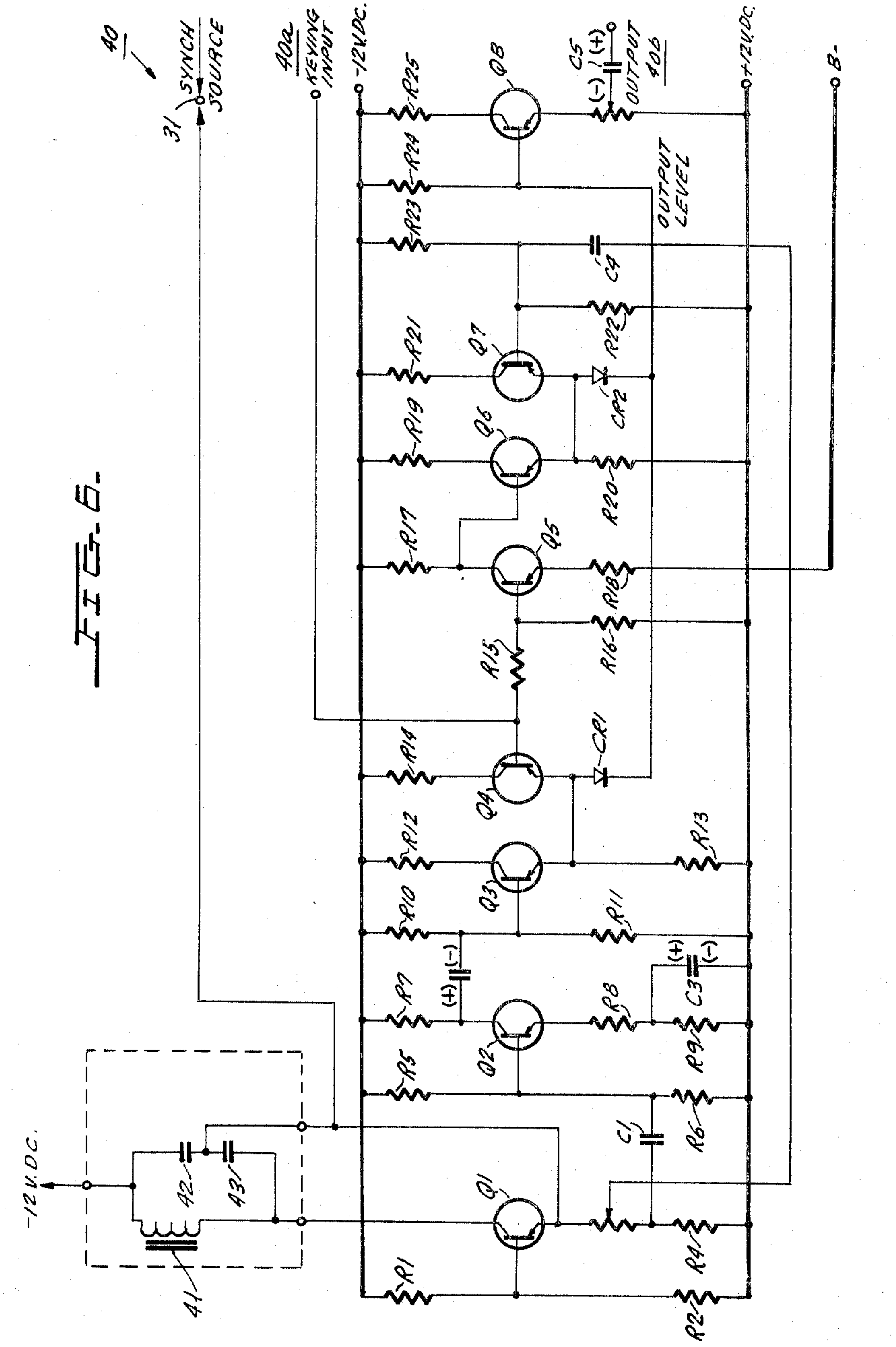
FIGURE 6 is a schematic diagram of the phase shift transmitter employed in the transmitter facility of FIGURE 2.

The phase shift transmitter 40 is shown in FIGURE 6 and is comprised of a first transistor Q1, having the tank circuit comprised of series connected capacitors 42 and 43 connected in parallel with inductance 41 which, in turn, is coupled to the collector electrode of transistor Q1. The common terminal between capacitors 42 and 43 is coupled to the emitter of transistor Q1 to establish an oscillating circuit which is tuned to any desired frequency rate. An output is taken at the common terminal between capacitors 42 and 43 to the point 31 which represents the sync source 31 which is employed in the transmitting synchronizer circuit 30 of FIGURE 6, previously described. The carrier frequency reference sine wave generated by the oscillator circuit is taken off a potentiometer R3 and impressed upon the base electrode of transistor Q7. The emitter electrode of transistor Q1 is further connected at the common terminals between resistors R3 and R4 to the base electrode of transistor Q2 which has its collector electrode connected to capacitor C2 to the base electrode of transistor Q3. Thus the reference sine wave passing through transistor Q2 which acts as an inverter, places an inverted sine wave upon the base electrode of transistor Q3 which is 180° out of phase with the reference sine wave impressed upon transistor Q7. The emitter electrodes of transistors Q3 and Q7 are connected through diodes CR1 and CR2, respectively, to the base electrode of transistor Q8 which develops the phase modulated output across a potentiometer R26 which appears at the output terminal 40*b* through a capacitor C5. The particular command code format transmitted at any given instant is impressed upon the keying input terminal, or modulating input terminal 40*a*. This impresses the modulating waveform simultaneously upon the base electrodes of transistors Q4 and Q5. Each positive level of the square pulse drives transistors Q4 and Q5 into cut-off, thus the refernce sine wave is coupled through the emitter of transistor Q3 and diode CR1 to the base electrode of transistor Q8. Transistor Q5, which is driven into cut-off, has its collector electrode go negative. Its collector electrode is coupled to the base electrode of transistor Q6, causing it to be driven into saturation. A voltage is thereby developed across the emitter of resistor R20, causing the emitter terminal of transistor Q6 to go substantially negative. This negative voltage is impressed upon the anode of diode CR2, preventing it from passing the reference sine wave impressed upon the base electrode of transistor Q7, to be passed to the base electrode of transistor Q8. Thus, the inverted reference sine wave is impressed upon the base electrode of transistor Q8 and appears at its output terminal 40*b*.

In the case where the input waveform is at the negative or binary zero level, this signal which is simultaneously impressed upon the base electrodes of transistors Q4 and Q5 drive these transistors into saturation. This causes the emitter electrode of transistor of Q4 to go negative, preventing the reference sine wave from bieng passed through diode CR1 to the base electrode of transistor Q8. The transistor Q5, having been driven into saturation, causes its collector electrode to go substantially positive. This positive voltage level is impressed upon the base electrode of transistor Q6, causing it to be driven into cut-off so that a substantially positive voltage appears at its emitter electrode. The emitter electrode of transistor Q6 is direcly coupled to the emitter electrode of transistor Q7, enabling transistor Q7 to be driven into saturation, thereby enabling the un-inverted reference sine wave to be passed from the emitter electrode of transistor Q7 through diode CR2 to the base electrode of transistor Q8. The un-inverted reference sine wave appears at the output terminal 40*b* through the emitter potentiometer R26 and capacitor C5. Thus, an output is developed by the phase shift transmitter which is shifted in phase by substantially 180° each time the square pulse inputs make a transition from negative to positive and vice-versa. The phase shift occurs when, and only when such a transition occurs in the modulating waveform.

Figure 7:
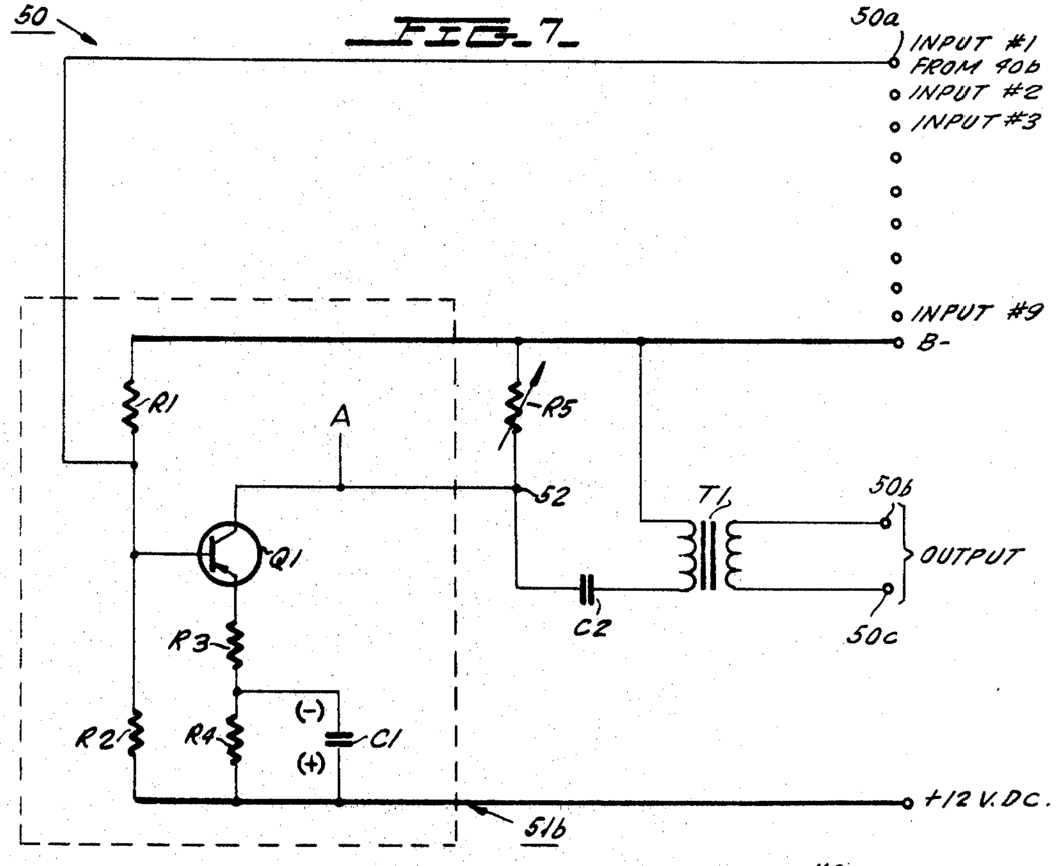
FIGURE 7 is a schematic diagram showing the mixer of FIGURE 2.

FIGURE 7 shows a schematic diagram of the mixer coupling the output of the phase shift transmitter to the communications link 62 (see FIGURES 6 and 2, respectively). The mixer stage is comprised of at least one transistor stage contained within the dotted box 51, having its input terminal 50*a* coupled to the base electrode of transistor Q1. The collector electrode is coupled through capacitor C2 to one terminal of a primary winding of transformer T1 which generates the phase modulated carrier frequency across its output terminals 50*b* and 50*c* which are coupled to link 62 in the manner shown in FIGURE 2. In cases where a plurality of phase shift transmitters, each operating at differing carrier frequencies, are to be transmitted through the link, additional transistor stages of the type 51 may be added, each being coupled to the terminal 52 and each having input terminals connected, respectively, to the output terminals of associated phase shift transmitter circuits.

RECEIVER FACILITY

The receiver facility 19 is shown in FIGURE 3 and is provided with a pair of terminals 63 for receiving the modulated carrier wave and impressing the modulated carrier upon the input terminals 110*a* of line matching circuit 110. The output of line matching circuit 110 appears at the output terminal 110*b* to be impressed upon the input terminal 120*a* of a phase shift receiver circuit 120. The phase shift receiver circuit 120 has a plurality of output terminals coupled to detection circuit 170 and a transmitting synchronizer circuit 130 which is substantially identical to the transmitting synchronizing circuit 30, shown in FIGURES 2 and 6. The phase shift receiver circuit 120, detector 170 and transmitting synchronizer circuit 130 cooperate to demodulate the phase modulated carrier generated at the transmitting facility and impress the demodulated and detected waveform upon an amplifier stage 180 which, in turn, impresses its output upon integrating means, such as a staircase generator circuit 190. The staircase generator circuit 190 develops an analog voltage representative of the cumulative levels of the Nyquist intervals within each bit interval, which analog voltage level is employed to determine the oneness, zeroness, or grayness of each binary bit examined. The output of staircase generator 190 appears at 190*b* and is impressed upon a gray bits detection circuit 200. The gray bits detection circuit examines the voltage level developed by the staircase generator to establish its oneness or grayness. If the zero bit threshold level is not achieved or exceeded, gray bits detector 200 fails to develop a binary one level signal at its output 201. If the analog voltage developed in the staircase generator 190 exceeds the binary zero bit threshold, the gray bits detector 200 develops a binary one output at its terminal 201, indicating that the binary bit examined is not a binary zero.

The transmitting synchronizer 130 develops a signal at its output terminal 131 once per bit interval, causing a one-shot multivibrator 132 to be triggered at its output terminal 132*b*, impressing a binary one state upon a second input terminal of AND gate 202. The third input terminal of AND gate 202 is connected to the output terminal 181*a* of binary flip-flop 181. This output terminal is binary one in the case where a bit examined has been indicated as not being binary one. The simultaneous presence of these three input signals of binary one level upon AND gate 202 indicates that a gray bit has been detected, thereby passing a binary one state through the amplifier 203 and the Darlington emitter followers 135 and 136 to the reset input terminals of the shift register circuit 140 through buses 137 and 138, respectively.

In the case where the staircase generator circuit 190 indicates that a binary one signal is present, the output terminal 181*b* goes to binary one, which is impressed upon one input of AND gate 142 to load a binary one state into the shift register circuit 140. The other input of AND gate 142 receives a binary one pulse from the flyback timer circuit 210 immediately upon the termination of a bit interval at which time the binary one state is loaded into the shift register circuit 140.

The signal developed by the transmitting synchronizer during each bit interval and appearing at output terminal 131 thereof is passed through one-shot multivibrator 132 and after a delay the trailing edge of the negative pulse developed at its output terminal 132*a* is impressed upon the trigger input terminal of one-shot multivibrator 134 whose output 135*a* is impressed upon the shift input terminal of each flip-flop stage in the shift register 140 to shift the binary bits into shift register circuit 140.

In the case where a bit examination shows that the bit is binary zero, the output terminal 181*b* of flip-flop 181 goes to binary one under control of the threshold circuit provided in staircase generator 190, which binary zero state is impressed upon one input of AND gate 141, the other input of which is received from the flyback timer 210 to load a binary zero into the shift register circuit 140. Subsequent to the loading of binary zeros as well as binary ones, the bits examined and detected are shifted in by a shift pulse appearing upon bus 143 to shift data bits from the left toward the right in the shift register circuit 140.

It should be noted that upon the detection of any gray bit, the shift register circuit 140 is instantaneously cleared, requiring that the command code format being transmitted be loaded anew into the shift register. As soon as a clear, unaltered code format is fully loaded into the shift register 140, the AND gate group 220 comprised of AND gates 221–223, 232 and 233 which are connected to selective outputs of the shift register 140 recognize the code format loaded into the shift register to take the appropriate action. In the case where a trip alarm code format has been transmitted AND gates 221 and 222 detect this condition, causing flip-flop 225 to develop a binary one level at its output which is passed through a relay driver 226 to energize relay 227, thereby initiating a tripping operation.

In the case where a test command code format has been transmitted, and successfully loaded in clear, unaltered form into shift register circuit 140, the AND gates 221 and 223 recognize this condition causing flip-flop 229 to be set to binary one at its output terminal which condition is passed through relay driver circuit 230 to light the test indicting lamp 231.

In the case where a rest or quiescent state code format is transmitted, this condition is recognized by AND gates 232 and 233 which develop a binary one signal automatically resetting bistable flip-flops 225 and 229 to cancel a trip operation and/or a test operation in readiness for any subsequent operation of the transfer trip system.

The receiver facility has all of its circuits powered by a suitable power supply 240 which is connected to a suitable A.C. source, preferably a 115 volt A.C. source 241 in order to develop the D.C. voltage levels of +12, −12, B− and −18 at its output terminals 240*a*–240*d*, respectively.

The detailed operation of the receiver facility 19, shown in FIGURE 3, is as follows:

The incoming phase modulated carrier which has been modulated by either a trip command, test command, or rest command code format, is coupled through the link to the input terminal 63 and pass through the line matching circuit 110. Line matching circuit 110 provides an isolated input for information derived from the communications link 63.

The output of line matching circuit 110, appearing at 110*b* is impressed upon the input to the phase shift receiver circuit 120 at its input terminal 120*a*.

Phase shift receiver circuit 120 generates a reference sine wave at its output terminal 121 for controlling the operation of transmitting synchronizer circuit 130. The output terminal 122 of phase shift receiver 120 generates a signal employed for the purpose of resetting the transmitting synchronizer circuit 130 simultaneously with receipt of the reference sine wave upon the input terminal 130*a* of transmitting synchronizer circuit 130.

Under control of the phase shift receiver circuit 120 the transmitting synchronizer circuit 130 develops an output signal once per bit interval at its output terminal 131 which is employed to trigger the one-shot multivibrator 132. This causes a negative square pulse to be generated at output terminal 132a, the trailing edge of which is employed to trigger one-shot multivibrator 134. The negative square output of one-shot multivibrator 132 thereby acts to delay the triggering of one-shot multivibrator 134 by a time duration equal to the width of the negative square pulse appearing at the output of one-shot multivibrator 132. The triggering of one-shot multivibrator 134 causes a positive square pulse to be developed at its output 135a which is employed as a shift-pulse input to the character memory or shift register circuit 140. The delayed output at 135a of one-shot multivibrator 134 triggers one-shot multivibrator 136 whose delay output at 137a is employed to reset bistable flip-flop 181, causing its output terminals 181a and 181b to go to the binary one and binary zero states, respectively.

The detector circuit 170, in cooperation with the phase shift receiver 120 developes an output at 171 which is applied as an input signal to D.C. amplifier 180 having a special bias to accommodate the D.C. level of the detector output. The output of the D.C. amplifier 180 becomes the input to staircase generator circuit 190. If a sufficient number of Nyquist intervals are present in the received bit being examined so as to drive the analog voltage level of the staircase generator output over the binary one bit threshold level the staircase generator 190 will develop an output at 190c to set the flip-flop 181 so that its output 181b goes to binary one and 181a goes to binary zero.

If there are sufficient Nyquist intervals emanating from the detector circuit 170 to cause the voltage level of staircase generator circuit 190 to exceed the zero bit threshold level which is set by the gray bits detector circuit 200, a binary one output will be developed at terminal 201 of gray bits detector 200.

Thus, if flip-flop 181 is in the set state (as opposed to the reset state) then a one-bit is said to be present. If flip-flop 181 is not in the set state and hence in the reset state, and the gray bits detector circuit 200 has not developed a binary one output then a zero bit is present. However, if flip-flop 181 is not set, but a binary one output is present at terminal 201 of the gray bits detector, then the AND gate 202 of the gray bits detector circuit 200 will develop an output which through D.C. amplifier 203 resets the shift register memory. Thus, with flip-flop 181 in the reset state, its output 181a is binary one, which condition is impressed upon the right-hand input of AND gate 202. Since the system is within a bit interval the remaining input of AND gate 202 receives a binary one indication from the output of one-shot multivibrator 132. This passes a binary one state through the D.C. amplifier 203 and simultaneously, through emitter follower circuits 135 and 136 to buses 137 and 138, respectively, thereby resetting all stages of the shift register memory 140.

Flyback timing circuit 210 which receives an output pulse from terminal 137b of one-shot multivibrator 136 and in accordance with receipt of this pulse times-out the length of a bit interval, generates a pulse indicative of the termination of a bit interval at its output terminal 211, which condition is passed through a D.C. amplifier 212, to be simultaneously impressed upon respective input terminals of AND gates 141 and 142 feeding the first stage of the shift register memory 140. Thus, with the flyback timer being reset by a signal from the output of one-shot multivibrator 136 and being adjusted to time-out after almost a complete bit interval, the flip-flop 181 impresses its output states appearing at terminals 181a and 181b upon the respective inputs of AND gates 141 and 142 to load a binary zero or binary one state into the first stage of shift register memory circuit 140.

If noise is present in the phase modulated carrier received from the transmitter facility the transmitting synchronizer circuit 130 will automatically be reset by the noisy output of phase shift receiver 120, causing multiple triggering of one-shot multivibrator 132 within a single bit interval which, in turn, resets the flyback timer circuit 210 so that it has insufficient time duration in which to time-out and generate a signal at its output 211.

If little or no noise is present in the receive phase modulated carrier, the flyback timer circuit 210 will time-out, developing a signal at its output 211 which passes through D.C. amplifier 212 and being at the binary 1 level allows the output of the flip-flop 181 to be shifted into the shift register memory.

It should be noted that when any bit examined is designated as being gray or ambiguous, the character memory register 140 will automatically reset, thereby requiring incoming bits which are examined and shown to be valid to be loaded anew into the memory.

The respective output terminals of the flip-flop stages 140a–140h are connected in a predetermined manner to the input terminals of AND gates 221, 222, 223, 232 and 233, which are employed to decode the codes for the trip test and rest command code formats. In the case where a trip command code format is transmitted, the output terminals RC, RD, RL, RF, RM, RG, RB and RJ of flip-flop stages 140a–140h, respectively, will be in the binary one state causing AND gate 221 to go to binary one at its output terminal. This enables AND gate 222 to go to binary one at its output terminal, which state is passed through D.C. amplifier 224 to the set input of flip-flop 225. This causes its output at 225a to go to binary one, activating relay driver circuit 226 for the purpose of energizing relay 227 which, in turn, initiates a trip operation. It should be noted that at this given instant neither AND gate 223 nor AND gates 232 and 233 will be enabled so that the only function performed at the receiver facility will be that of initiating a tripping operation.

If a test code format is transmitted, output terminals RC, RK, RE, RF, RM, RN, RH, and RJ of flip-flop stages 140a–140h, respectively, will be at binary one, causing AND gate 221 to become enabled, passing a binary one condition to one input terminal of AND gate 223. This enables AND gate 223 to generate a binary one at its output terminal which is passed through D.C. amplifier 228 to set flip-flop 229 causing its output terminal 229a to go to binary one. This activates relay driver 230 for the purpose of energizing test lamp 231 indicative of the fact that a test code command format has been received.

In the case where a rest code command format has been successfully received and loaded into the register memory 140, output terminals RC, RK, RL, RS, RU, RG, RH and RJ will go to binary one state, thereby enabling AND gate 232 to pass a binary one state to one input of AND gate 233 enabling AND gate 233 to pass a binary one condition through its output and D.C. amplifier 234 to the reset input terminals 225b and 229b of flip-flops 225 and 229, respectively. Thus, the receipt of a rest code format automatically erases any trip alarm or test alarm indication at the receiver facility and places the receiver facility in condition for subsequent test or code command formats. Since the rest code format is continuously sent so long as it is detected as having been received in unaltered fashion, reset pulses will continue to be applied to reset input terminals 225b and 229b, respectively. It should be noted that for any given code format only one of the three code formats can be detected at any given instant so that there is no danger of receiving and hence detecting two code formats simultaneously.

The instant invention provides unique advantages when used in systems employing non-return to zero code formats. For example, considering the waveforms *a* and *b* of FIGURE 14a, it will be seen that the rest code format remains continuously at the binary one bit level for a time duration equal to the total length of four successive bit intervals, there being no return to zero during the transmission of these four binary bits. Thus, the code format fails to provide any means within the code itself for establishing when the second, third and fourth bits of the four binary one bit code grouping begins. This function is clearly and extremely accurately performed by the flyback timer circuit 210, shown in FIGURE 3, and which will be described in more detail. The flyback timer is triggered to initiate a timing interval at the instant at which the first binary bit is received and will "time-out" at the end of such a bit interval. Flyback timer 210 will continue to time-out for each successive bit interval, thereby clearly establishing when the termination of each bit interval occurs. Thus, the transfer trip system of the instant invention has an extremely high degree of accuracy in systems employing either return to zero or non-return to zero code formats.

Figure 8:
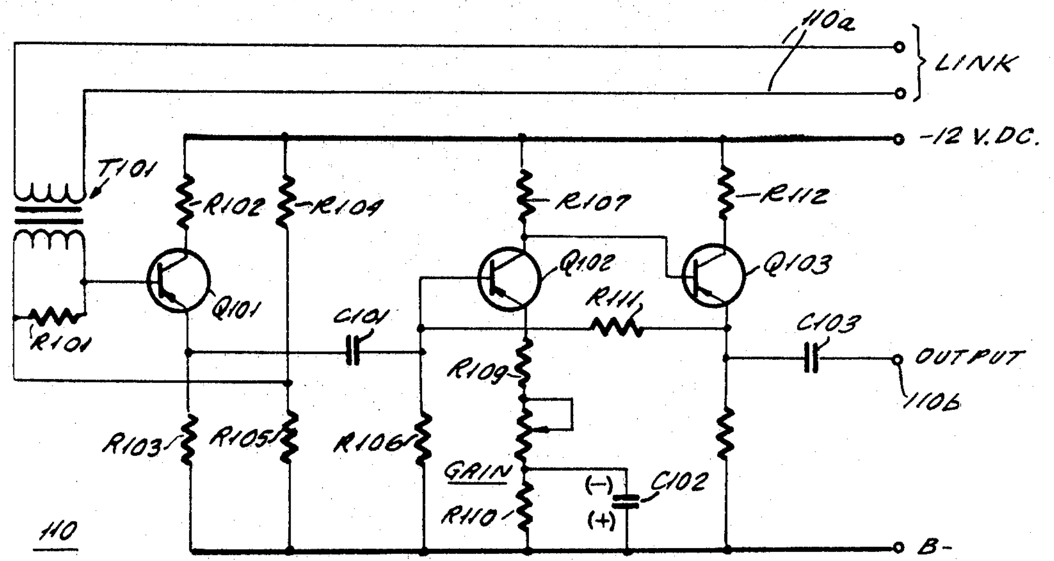
FIGURE 8 is a schematic diagram of the mixer employed in the receiver facility of FIGURE 3.

FIGURE 8 is a schematic diagram of the line matching circuit 110. The input terminals 110*a* receive the phase modulated carrier from the link and impress it upon the primary of a transformer TR–1, the secondary winding of which is coupled to the base electrode of transistor Q101. This transistor is connected in emitter follower fashion with its emitter electrode coupled to the base of transistor Q102 and the emitter of transistor Q103. Transistor Q102 is connected in inverter-amplifier fashion with its collector electrode coupled to the base electrode of transistor Q103. Transistor Q103 has its emitter electrode connected to the output terminal 110*b* of the line matching circuit. Emitter connected potentiometer R109 is adjustable to control the gain of the line matching circuit 110. The circuit 110 serves to match the impedance of the incoming link to the receiver facility.

Figure 9:
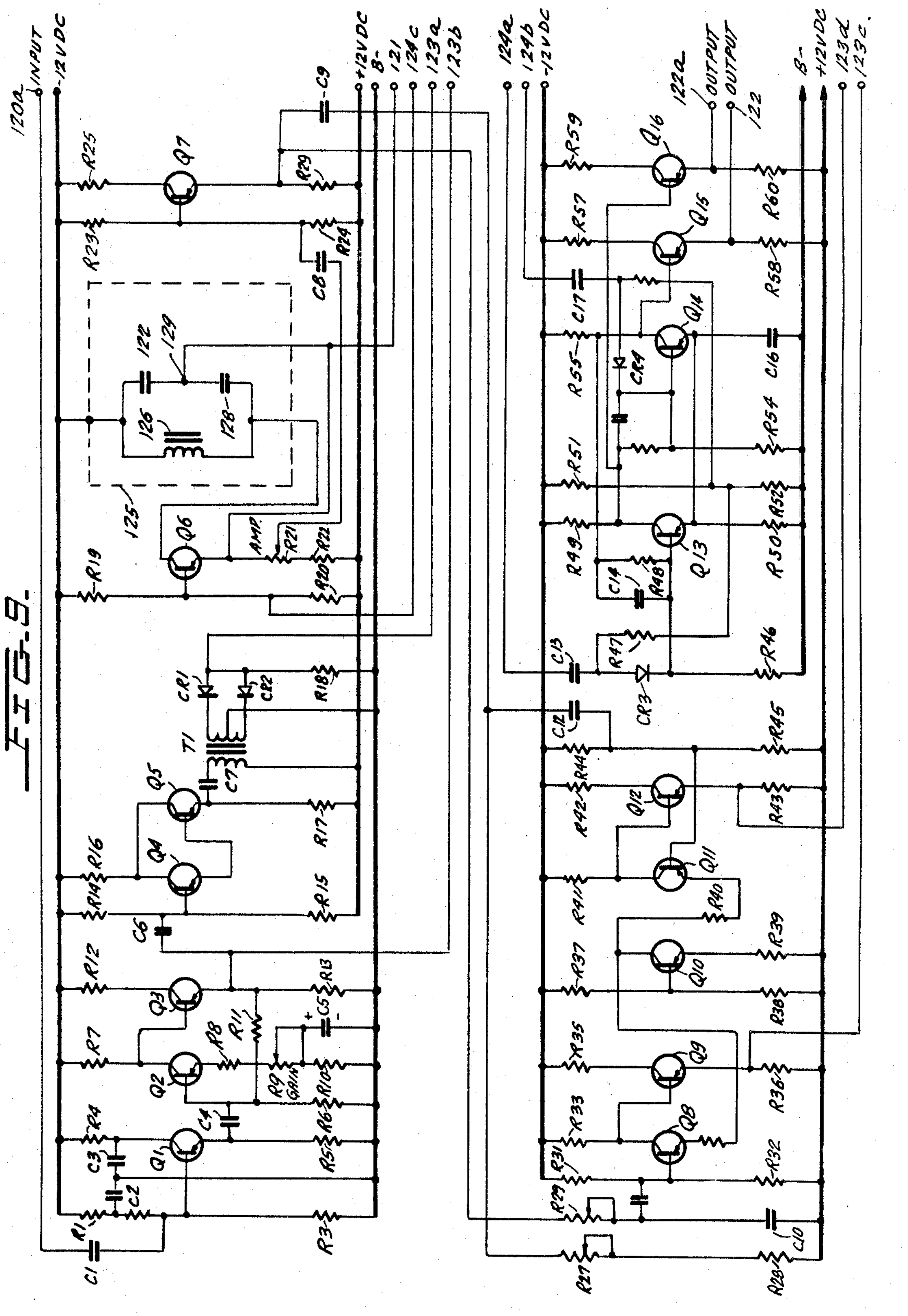
FIGURE 9 is a schematic diagram of the phase shift receiver employed in the receiver faciilty of FIGURE 3.

FIGURE 9 is a schematic diagram of the phase shift receiver 120. The incoming phase modulated carrier which passes through the line matching circuit 110 is impressed upon input terminal 120*a* of phase shift receiver 120. This signal is coupled to the base electrode of transistor Q1 and connected in emitter follower fashion. The emitter electrode is coupled to the base electrode of transistor Q2, which is connected in amplifier-inverter fashion with its collector electrode coupled to the base electrode of transistor Q3. A potentiometer R9 in the emitter circuit of transistor Q2 is employed to provide gain adjustment capabilities for the transistor Q3 which is connected in emitter follower fashion and has its emitter electrode coupled to the base electrode of transistor Q4 and also appears at output terminal 123*b* to be impressed upon the input terminal 172*a* of detector circuit 170, for a purpose to be more fully described.

Transistor Q4 is connected with its emitter and collector electrodes, respectively, across the base and collector electrodes of transistor Q5, the transistors Q4 and Q5 constituting a Darlington emitter follower circuit which is employed for the purpose of providing high current gain at the emitter electrode of transistor Q5. The phase modulated carrier is impressed across the primary winding of a transformer T1 whose secondary winding is coupled to diodes CR1 and CR2 to full wave rectify the phase modulated carrier with the full wave rectified signal appearing at the output terminal 123*a*. Thus the output terminals 123*a* and 123*b* have the full wave rectified phase modulated carrier and the un-altered phase modulated carrier, which signals appear at the input terminals 172*a* and 172*b* of the detector circuit 170, shown in block diagram form in FIGURE 3, and shown in schematic form in FIGURE 10.

Figure 10:
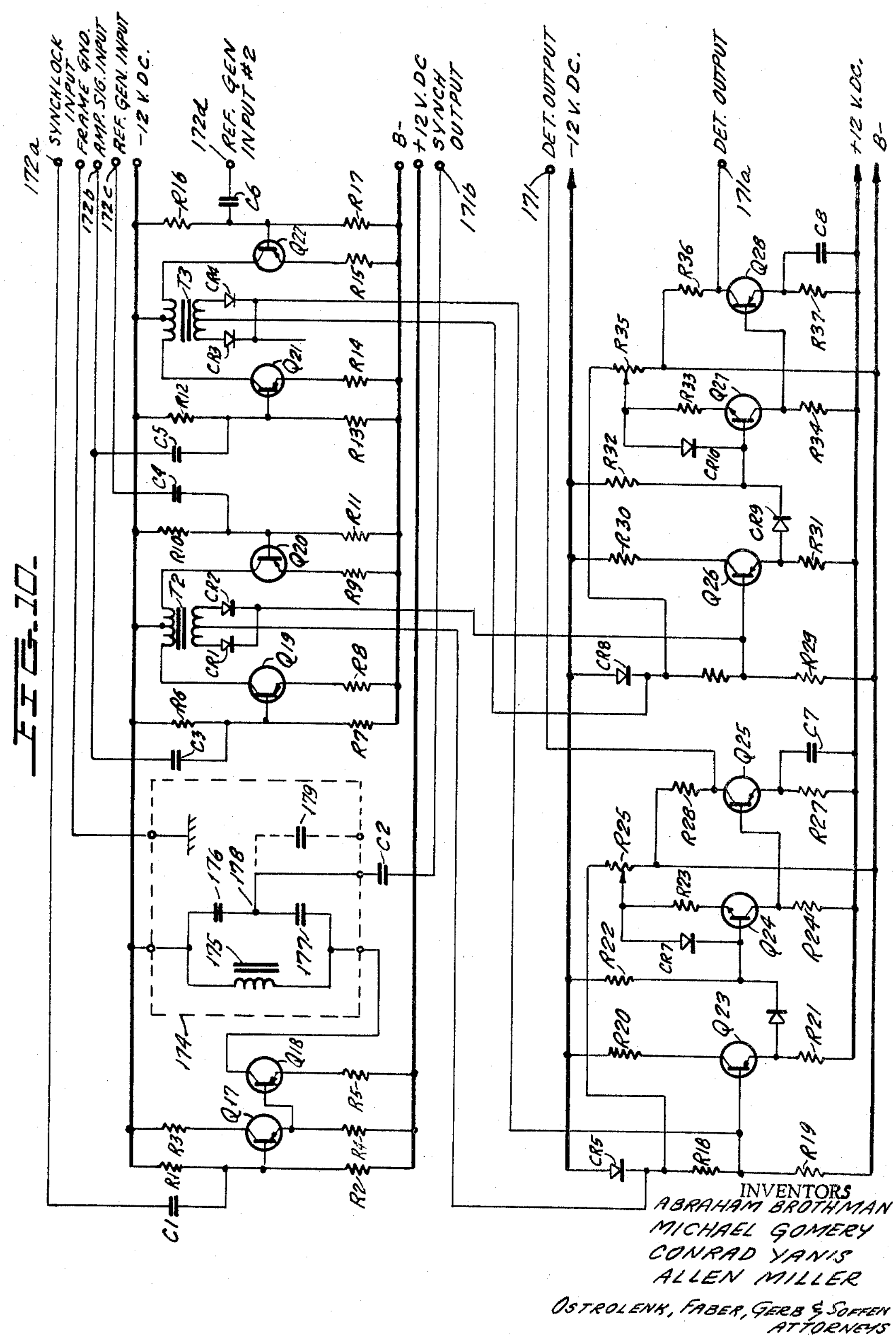
FIGURE 10 is a schematic diagram showing the detector employed in the receiver facility of FIGURE 3.

For the remainder of the description covering the demodulation and detection of the incoming phase modulated carrier, reference will be made to both FIGURES 9 and 10. Turning to FIGURE 10 at this time, the full wave rectified phase modulated carrier, which appears at input terminal 172*a* is impressed upon the base electrode of transistor Q17 of detector circuit 170. This transistor is connected in emitter follower fashion and couples its emitter electrode to the base electrode of transistor Q18.

Transistor Q18 has its collect or electrode coupled to a tank circuit 174 comprised of inductor 175, connected in parallel to the series connected capacitors 176 and 177. The values of elements 175–177 are selected so as to resonate at a frequency which is exactly two times the carrier frequency rate of the incoming phase modulated carrier. Since the input to transistor Q17 and hence, the input to transistor Q18 is a full wave rectified signal, this input is at twice the incoming carrier frequency rate, thereby forcing the oscillator circuit comprised of tank circuit 174 to generate a sine wave at its output 178 which is exactly twice the frequency rate of the incoming carrier frequency from the transmitter facility. This sine wave is used as a synchronizing output appearing at output terminal 171*b* of the detector circuit 170 to be impressed upon the input terminal 124*c* of the phase shift receiver circuit 120, shown in FIGURE 9.

Turning now to FIGURE 9, this synchronizing sine wave at twice the system carrier frequency appearing at input terminal 124*c* is impressed upon the base electrode of transistor Q6 which has its collector electrode coupled to a tank circuit 125 comprised of inductor 126, connected in parallel across series connected capacitors 127 and 128. The values of these elements are selected so as to generate at exactly the carrier frequency being driven by a signal which is twice the carrier frequency rate. The oscillator circuit comprised of the tank circuit 125 and transistor Q6 which is commonly referred to as being a Colpitts oscillator, is both frequency and phase locked to the transfer trip system carrier frequency. Its output is taken at the common terminal 129 between capacitors 127 and 128 and appears at output terminal 121 which is coupled to the input terminal 130*a* of transmitting synchronizer 130, shown in block diagram form in FIGURE 3 and shown in schematic form in FIGURE 5. Thus, the system carrier frequency is employed to the transmitting synchronizer to undergo clipping and amplifying to form a square wave and further to be divided by the connected flip-flop stages shown in FIGURE 5, in the same manner as was previously described.

Continuing with the schematic diagram of FIGURE 9, the carrier frequency which is frequency and phase locked is taken from the emitter connected potentiometer R21 of FIGURE 9, which is provided for adjusting the amplitude of the carrier output signal, and is impressed upon the base electrode of transistor Q7, which is connected in emitter follower fashion with its emitter electrode coupled to first terminals of potentiometers R27 and R29 which are ganged potentiometers as shown at R29*a* forming with the capacitors C10 and C11 a phase shifting circuit to adjust the carrier frequency to any desired phase. The output of the phase shifting circuit is coupled to the base electrode of transistor Q8 through capacitor C11. The collector electrode of transistor Q8 is connected to the base electrode of transistor Q9 upon which appears the carrier frequency in inverted fashion. The emitter electrode of transistor Q8 is coupled to the collector electrode of transistor Q10, as well as to the emitter electrode of transistor Q11 through a resistor R40. The collector electrodes of transistors Q8 and Q11 are exactly 180° out of phase with one another, which complementary carrier frequencies appear at the emitter electrodes of emitter follower connected transistors Q9 and Q12. The output taken from transistor Q9 appears at output terminal 123*c* of FIGURE 9, while the emitter electrode of transistor Q12 has its output appearing at the output terminal 123*d*, shown in FIGURE 9.

Turning now to FIGURE 10, these carrier frequency signals which are 180° out of phase with one another are impressed upon the input terminals 172*c* and 172*d* of detector circuit 170, to be impressed respectively, upon the base electrodes of transistors Q19 and Q22, respectively. Input terminal 172*b* of detector 170 which receives the un-altered but amplified phase modulated carrier signal couples this signal respectively, to the base electrodes of transistors Q19 and Q21 simulianeously.

The collector electrodes of transistors Q19 and Q20 are connected across the end terminals of the primary winding of transformer T2 which has its secondary winding connected to diodes CR1 and CR2 to form a full wave rectifier circuit. In a like manner, the collector of transistors Q21 and Q22 are coupled across the primary winding of transformer T3 which has its secondary winding connected to the diodes CR3 and CR4, forming a second full wave rectifier. It can be seen that the circuits which include the transformers T2 and T3 are substantially identical. Turning to a description of the circuit including transformer T2, it can be seen that the phase modulated carriers impressed upon the base electrode of transistor Q19, while the reference generator frequency which is phase and frequency locked to the system carrier frequency is impressed upon the base electrode of transistor Q20. If these two signals are in exact synchronism, a zero or substantially zero voltage is developed across the primary winding of transformer T2, causing a zero or substantially zero rectified output to appear at the common terminal between the cathodes of diodes CR1 and CR2. This circuit thereby forms a difference amplifier which develops a zero voltage or binary zero level output in the case where there is phase synchronism.

In the case where the inputs to transistors Q19 and Q20 are 180° out of phase, then a maximum or substantially maximum voltage will be developed across the primary winding of transformer T2 causing a full wave rectified output substantially different from zero voltage level to be developed at the common terminal between the cathodes of diodes CR1 and CR2. The voltage output developed by the difference amplifier circuit is impressed upon the input terminal of a transistors Q26.

Turning to the second difference amplifier circuit in which the transformer T3 is employed, it can be seen that this circuit being identical to the circuit already described, will perform in a like manner. It should be noted, however, that when phase synchronism occurs, one difference amplifier of phase opposition will be present within the remaining difference amplifier so that while one of the tow difference amplifiers will generate a voltage substantially different from zero, the remaining of the two difference amplifiers will fail to generate any output. The output appearing at the common terminal between the cathode electrodes of diodes CR3 and CR4 is coupled to the base electrode of transistor Q23. Considering the operation of transistor Q23, this transistor is connected in emitter follower fashion with its emitter electrode coupled through diode CR6 to the base electrode of transistor Q24. The emitter electrode of transistor Q24 is coupled through a resistor R23, a potentiometer R25 and a Zener diode CR5 to the −12 volt D.C. bus. The base electrode of transistor Q24 is also coupled to potentiometer R25 through a diode CR7 forming an OR gate with the diode CR6. Considering this OR gate circuit, it can be seen that the base electrode of transistor Q24 will accept the higher of two positive voltages which may be impressed upon the diodes CR6 and CR7. Diode CR7, together with potentiometer R25 determine the threshold level for transistor Q24 which is commonly referred to as a threshold amplifier. Transistor Q24, during normal operation is biased by diode CR7 so as to be in cut-off state. When a positive voltage is developed by the difference amplifier which includes the transformer T3, the anode of diode CR6 will go more positive than the anode of diode CR7, causing transistor Q24 to be driven into conduction. Potentiometer R25, being adjustable, will eliminate output levels below any selected threshold, depending upon the adjustment thereof. When the threshold level is achieved, or surpassed and transistor Q24 is driven into conduction, a substantially negative voltage level is impressed upon the base electrode of transistor Q25 causing it to go into conduction and developing an output at its collector electrode with appears at the output terminal 171 of detector circuit 170.

In a like manner, the output from the difference amplifier in which the transformer T2 is employed is impressed upon the base electrode of transistor Q26 which couples the output of the difference amplifier to the base electrode of transistor Q27 through diode CR9. Diodes CR9 and CR10 form an OR gate substantially identical to the OR gate formed by diodes CR6 and CR7, already described. Resistor R35 coupled through resistor R33 to the emitter electrode of transistor Q27 and through diode CR10 to the base electrode of transistor Q27 form a threshold amplifier identical to the threshold amplifier employing transistor Q24. Potentiometer R35 permits for a threshold adjustment. Thus, when the difference amplifier in which the transformer T2 is employed, generates a voltage level indicative of an out of phase relationship the threshold level of the threshold amplifier employing transistor Q27 is achieved or surpassed, causing the transistor to be driven into conduction, applying a substantially negative voltage upon the base electrode of transistor Q28. This drives transistor Q28 into conduction causing an output to appear at the terminal 171*a*. It should be noted that the outputs at terminals 171 and 171*a*, at any given instant, are complementary to one another so that when one identifies a binary one state the other one identifies a binary zero state.

It should be noted that while there is no convenient way of determining when a binary one or binary zero is being received, the choice of which output 171 or 171*a* is to be identified as a binary one to the exclusion of the other, is relatively immaterial due to the regularly alternating code format of the trip test and rest command codes employed. For example, if the first bit received is in actuality a binary one and is arbitrarily identified to be a binary zero, this in no way affects the accuracy and reliability of the system, but simply delays the code format loading into the shift register character memory 140 of FIGURE 3 by one bit interval which has a time duration of the order of microseconds.

The output terminals 171 and 171*a* of FIGURE 10 are connected to the input terminals 124*a* and 124*b* of phase shift receiver circuit 124, shown in FIGURE 9. These input terminals are respectively coupled to the base electrodes of transistors Q13 and Q14, respectively, which form a binary flip-flop circuit for storing the detected state of the phase modulated carrier transmitted from the transmitter facility. The collector electrode of transistor Q13 is coupled to the base electrode of transistor Q16 which is connected in emitter follower fashion and has its output appearing at terminal 122*a*. The collector electrode of transistor Q14 is connected to the base electrode of transistor Q15 which is connected in emitter follower fashion and has its output appearing at terminal 122. Terminal 122 impresses the resultant state upon the transmitting synchronizer input terminal 130*b*. The state of the flip-flop comprised of transistors Q13 and Q14 remains in the binary one (or binary zero) state until the next transition state occurs. The output terminal 171 of detector circuit 170 shown in FIGURE 10, is further coupled through the D.C. amplifier 180, shown in FIGURE 3, to the input terminal 190*a* of the staircase generator 190 for the purpose of developing an analog voltage level for determining the status of the incoming bit.

It should be noted at this time that while the waveforms *a*, *b* and *c*, shown in FIGURE 14*a*, are substantially square pulse wave trains, each square pulse is made up of a plurality of carrier wave cycles. For example, the waveform *c*, having the highest bit repetition rate is such that each binary one (or binary zero) bit is formed of a pluraity of full cycles of the carrier frequency with the exact relationship being determined by the requirements of the system. The half-cycle portion of each carrier frequency cycle constitutes the smallest amount or portion of any given binary bit, the information state of which can be recognized. Each half-cycle or interval is commonly referred to as a Nyquist interval and it becomes the function of the staircase generator circuit to examine each half-cycle or Nyquist interval within each individual bit interval to establish how many such intervals are present and when a satisfactory number of such intervals are present to generate a voltage indicative of the fact that either a binary one or binary zero data bit is present. For example, any Nyquist interval, or portion thereof, may be severely altered due to the presence of noise on the link. This noise may take any of the typical forms such as drop-out noise, impulse noise, and white or random noise, which may affect the quality of the phase modulated carrier being transmitted. For example, the positive going half-cycle of a carrier frequency may be severely altered by dropout noise causing the Nyquist interval to be severely altered or completely cancelled. In the case of a negative half-cycle or Nyquist interval, impulse noise may be present on the link causing the negative half-cycle to be reversed and to appear as a positive half-cycle of carrier due to the effect of noise upon the link. The total number of Nyquist intervals within any given binary bit interval may be adjusted, depending upon the needs of the user, for the purpose of regulating the sensitivity of the receiver facility to the incoming wave train.

FIGURE 11 is a schematic diagram showing the Staircase generator circuit 190 shown in block diagram form in FIGURE 3. The Nyquist intervals detected by detector circuit 170 and appearing at its output terminal 171 are impressed upon the input terminal 190*a* of the staircase generator circuit shown in FIGURE 11.

The operation of the staircase generator circuit 190 is as follows:

The staircase generator circuit 190 is comprised of an input terminal 190*a* for receiving Nyquist interval information which is to be more fully described, and impressing the Nyquist interval information upon the base electrode of a transistor Q1. Transistor Q1 is connected in inverter-amplifier fashion with its collector electrode connected through resistor R2 to the positive D.C. bus 192 and having its emitter electrode connected through resistor R3 and Zener diode CR1 to the negative D.C. bus 191. The collector electrode of transistor Q1 is connected through the parallel connected components resistor R5 and capacitor C1, to the base electrode of transistor Q2. Transistor Q2 is connected in emitter follower fashion for impedance match purposes between the inverter-amplifier of transistor Q1 and the base electrode of the next transistor stage Q3. The emitter of transistor Q2 is connected through capacitor C2 and adjustable potentiometer R7 to the base electrode of transistor Q3. Transistor Q3 is connected so as to be normally in cutoff state and has its collector connected to the minus D.C. bus 191 through capacitor C3. When transistor Q3 is driven into saturation, this permits the capacitor C3 to charge in a linear fashion so as to cause the common terminal 193 between the collector of transistor Q3 and capacitor C3 to become more positive. Terminal 193 is directly connected to the base electrode of transistor Q6 which has its emitter and collector electrodes respectively, of transistor Q7 so as to form a Darlington emitter follower circuit to provide substantial current amplification of the signal level at terminal 193. The output of the Darlington emitter follower circuit is taken at the emitter of transistor Q7 and impressed upon the base electrode of transistor Q8 which is connected as an inverter amplifier circuit with its collector electrode connected to the base electrode of transistor Q9 which also is connected in inverter-amplifier fashion. The output for the staircase generator circuit 190 is taken at the collector electrode terminal 190*c* of transistor Q9.

Instantaneous discharge of capacitor C3 is provided for by means of the transistor Q5 whose base electrode is adapted to receive a reset input signal at reset input terminal 194 which receives the output signal from output terminal 135*a* of one-shot multivibrator 134, shown in FIGURE 3. A positive voltage level is impressed upon the base electrode of transistor Q5, driving the emitter electrode positive and hence driving the base electrode of transistor Q4 positive so as to drive transistor Q4 into saturation, thus causing instantaneous discharge of capacitor C3 through transistor Q4.

Figure 15:
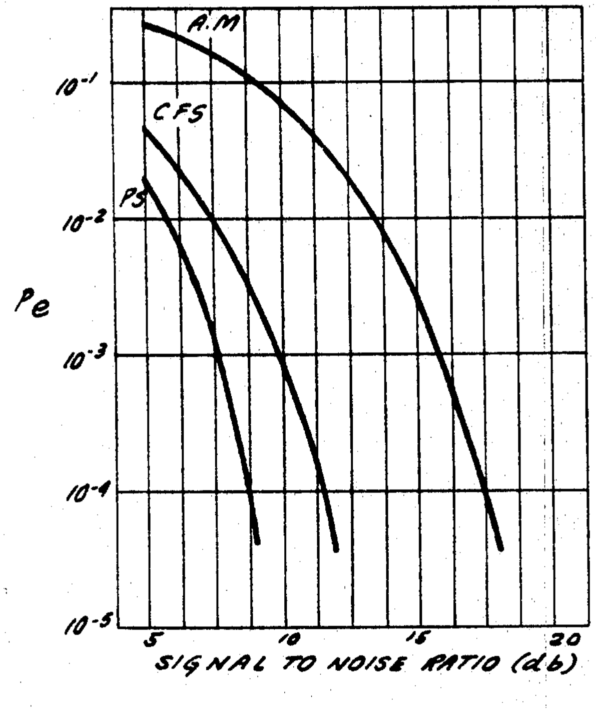
Figure 15C:
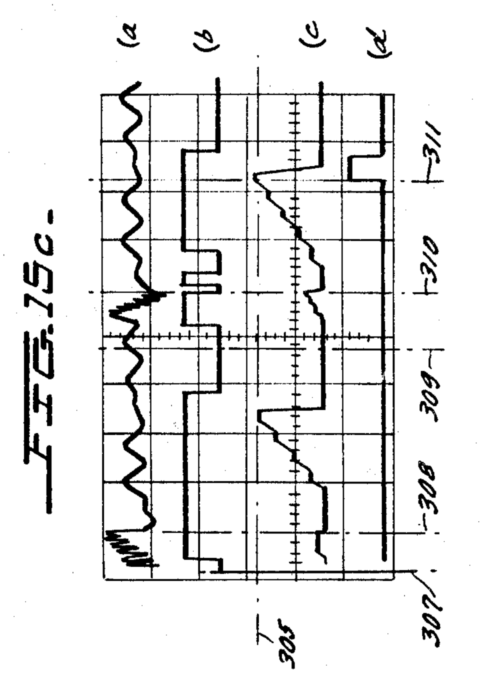
Figure 15D:
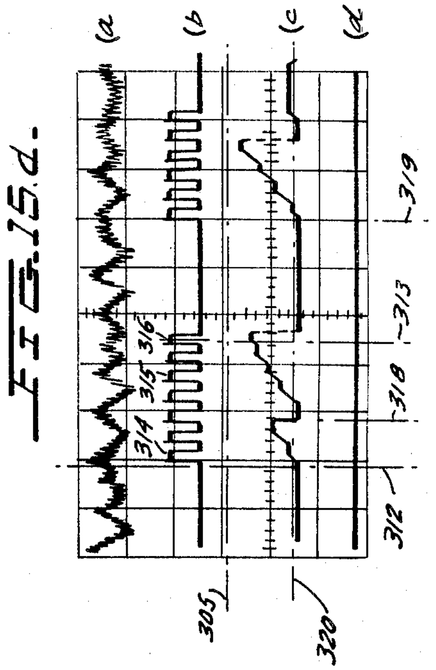
Figure 15A:
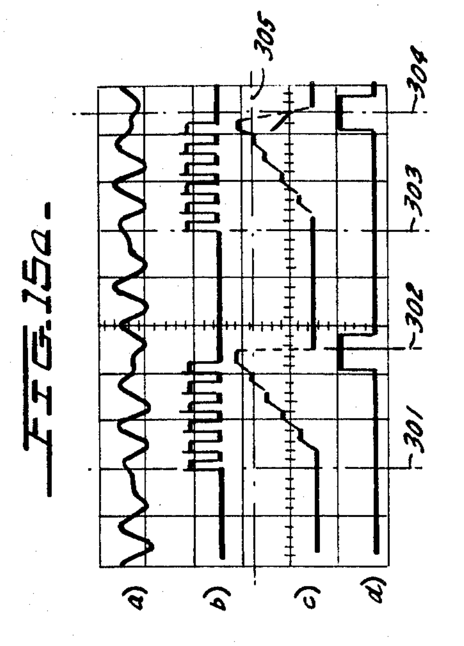

The overall operation of the staircase generator of circuit 40 (considering also the waveforms of FIGURES 5*a* and 5*b*) is as follows:

Considering FIGURE 15*a* in conjunction with FIGURE 11, let it be assumed that during a bit interval a mark, or binary one bit is being received completely error-free. This means that during the entire bit interval between lines 301–302, the mark detector input will achieve (or surpass) the threshold level. This will yield the positive square pulses during the time interval 301–302, as shown at waveform *b*, (FIGURE 15*a*) from the phase shift demodulator. During each one of these positive square pulse intervals the capacitor C3 will linearly charge by an equal amount. The cumulative voltage developed across capacitor C3 will be sufficient to achieve a predetermined threshold level 305 causing an output signal to be yielded at the output terminal 190*c*.

If, however, the mark or binary one data bit being examined has been subjected to link noise so that the binary one bit is not in the binary one phase throughout the entire bit interval, this will affect the phase modulated carrier so that the square pulses generated at the output terminal of the comparison circuit threshold gate will no longer be of equal time duration. Turning now to the waveforms of FIGURE 15*c*, let it be assumed that the carrier, in transmitting a binary one bit during interval 309–310, has been subjected to noise, resulting in the waveform *a* of FIGURE 15*c*. It can be seen that the square pulses representing Nyquist intervals, are clearly of unequal time duration due to the effect of noise upon the incoming binary one bit being examined. The result is that the output of staircase generator 190 (waveform *c*) fails to aciheve the threshold level 305, thereby generating a binary zero indication.

Immediately after a bit has been processed, the delay circuit 134 of FIGURE 3 generates an output for resetting the staircase generator circuit. This output instantaneously discharges. The output 135*a*, which is a positive *a* level, is impressed upon the input terminal 194 of the staricase generator 190, shown in FIGURE 11. A positive bias is impressed upon the base of transistor Q5 which is connected in emitter follower fashion, causing its emitter electrode to go substantially positive. This positive voltage level is impressed upon the base of transistor Q4, which is instantaneously driven into saturation. The saturation state of transistor Q4 causes capacitor C3 of circuit 190 to instantaneously discharge.

In order to charge capacitor C3 the first Nyquist interval square pulse of waveform *b* (FIGURE 15*a*) is impressed upon the base input terminal of transistor Q1. Transistor Q1 inverts the signal level at its base and presents its output from the collector electrode to the base electrode of transistor Q2. The voltage level at the base of Q1 being positive, causes its collector to go negative, impressing a negative pulse upon the base of transistor Q2. Transistor Q2 being connected in emitter follower fashion, generates a negative square pulse at its emitter electrode and impresses this negative square pulse upon the base of transistor Q3, driving transistor Q3 into saturation. The saturation state of transistor Q3 causes capacitor C3, connected in series with its collector electrode, to charge in an extremely linear manner as shown by the waveform *d*. The charging of capacitor C3 continues for the interval of each Nyquist interval square pulse and specifically during the time interval 301–302. At the end of each Nyquist square pulse transistor Q3 is instantaneously driven into cut-off, preventing capacitor C3 from undergoing any further charging. This condition is maintained until receipt of the next positive Nyquist square pulse is impressed upon input terminal 190*a*.

The criteria of acceptance of a binary bit as an unambiguous binary one (or zero) may be set at any desired level. For example, the ideal criteria may be set up so as to require that the binary one level of the bit represented by waveform *a* of FIGURE 15*a* may be present during the entire interval from time 301 to time 302. This level hereinafter referred to as the threshold level is represented by the horizontal line 305 of FIGURE 15*a*. This threshold level is achieved by virtue of the transistor Q8 which is biased so that its cut-off level is substantially at the threshold level represented by horioznItal line 305. This threshold level may be readily adjusted by virtue of the potentiometer R15. The output level at terminal 193 of capacitor C3 is connected to the base of transistor Q6, which transistor is so connected with transistor Q7 so as to form a Darlington emitter follower circuit. An emitter follower circiut of this type is employed for the purpose of yielding high current gain for the circuit. The output of the Darlington emitter follower arrangement is taken at the emitter of transistor Q7 and is coupled through series connector resistors R16 and potentiometer R15 to the base of transistor Q8. As previously mentioned transistor Q8 is maintained in cut-off state until the voltage level at its base electrode becomes suffiicently positive to drive it into saturation. In the graphic example of FIGURE 15*a*, the threshold level has been selected so as to require that less than the entire bit duration of all the six Nyquist interval square pulses 50*d* be present. In accordance with the link requirements of any given application, this threshold level may be selected dependent upon the desired reliability of the system in which it is employed.

Once the threshold level is achieved and transistor Q8 is driven into saturation, the collector electrode goes negative, driving transistor Q9 instantaneously into cut-off and hence yielding a positive output signal at its collector terminal ouptut 190*c*.

The output terminal 190*c* of staircase generator 190 is coupled to the set input of bistable flip-flop 181 shown in FIGURE 3 so that when the threshold level of the staircase generator is achieved or surpassed, a binary one state will be impressed upon the set input terminal of flip-flop 181. The actual analog output level of staircase generator circuit 190 appears at the output terminal 190*b* to be impressed upon the input of the gray bits detector circuit 200, shown in FIGURE 12. The gray bits detector circuit 200 has its input terminal 200*a* connected to the output terminal 190*b* of staircase generator 190 and impresses this analog voltage level upon the base electrode of transistor Q4. The emitter electrode of transistor Q4 is connected in common with the emitter electrode of transistor Q3 which develops a self-bias voltage level across capacitor C1. The transistor Q3 will fail to be driven into conduction until a predetermined voltage level is achieved or surpassed, which voltage level is representative of a threshold setting which is substantially greater than zero, but substantially less than the binary one threshold level set within the threshold circuit of staircase generator 190. FIGURE 12*a* shows a waveform 206 representative of the charging of the capacitor C3 of staircase generator circuit 190 which is shown in FIGURE 11. The threshold level of the staircase generator threshold circuit is shown by the horizontal line 205, shown in FIGURE 12*a*. The threshold level of circuit 200, shown in FIGURE 12, is designated by the horizontal line 204 of FIGURE 12*a*. When the threshold level 205 is achieved or surpassed, staircase generator circuit 190 will generate an indication that the bit under examination is identified as a binary one bit in order to set flip-flop 181, shown in FIGURE 3.

In the case where the bit under examination fails to develop a voltage across the capacitor C3 of staircase generator circuit 190 which reaches the threshold level 204, shown in FIGURE 12*a*, then staircase generator 190 will fail to develop an output at its terminal 190*c* and gray bits detector circuit 200 will likewise fail to generate a signal indicative of the fact that a gray bit is present. In the third instance, if the capacitor C3 of staircase generator circuit 190 develops a voltage which has an amplitude less than the threshold level 205 of FIGURE 12*a*, but greater than the threshold level 204, this is the time at which transistor Q3 will become conductive, driving the transistor Q2 which has its base electrode coupled to the collector electrode of transistor Q3, into cut-off. This establishes substantially a negative voltage at the input of diode CR3 which, together with diodes CR4 and CR5 form the AND gate 202, shown in FIGURE 3. When all of these inputs are at the binary one level, that is at the substantially ground potential level, transistor Q1 is driven into conduction developing a binary one output at its emitter electrode establishing a binary one voltage level at the output terminal 202*a*. As was previously described with reference to FIGURE 3, this binary one level is impressed upon a D.C. amplifier 203 and simultaneously through Darlington emitter follower circuits 135 and 136 so as to reset all the stages 140*a*–140*h* of the character memory register 140 of FIGURE 3.

The flyback timer circuit 210, shown in block diagram form in FIGURE 3, is shown in schematic form in FIGURE 13 and has its input terminal 210*a* which receives a positive square pulse from the output terminal 137*b* of one-shot multivibrator 136 shown in FIGURE 3, impresses this square pulse upon the base electrode of transistor Q1.

FIGURE 13 is a schematic of the bit interval timing device. The timing circuit, hereinafter designated as a flyback timer, is generally designated by the numeral 210 and is comprised of reset input terminal 210*a* for the purpose of resetting the flyback timer circuit and thus beginning a new timing interval, in a manner to be more fully described. These input terminals are connected to the base electrode of a transistor Q1, having its emitter terminal connected through a Zener diode CR1 to −12v. D.C. bus 212. The collector electrode of transistor Q1 is connected through the series connected resistor and diode elements R4 and CR2, respectively, to a +12 volt D.C. bus 213. The collector electrode of transistor Q1 is further connected to the base electrode of a transistor Q2, which is connected to the bus 212 through series connected capacitors C2 and C3. The emitter electrode of transistor Q2 is connected through a capacitor C4 to the common point 214 between resistors R4 and diode CR2, thus establishing a feed-back path. The emitter electrode of transistor Q2 is further connected to the base electrode of transistor Q3 through resistors R8 and R9. The feed-back path comprised of capacitor C4, which is connected to terminal 30 of resistor R4, connects this current path through a resistor (R4) which develops a constant voltage V across its terminals so as to cause a constant current I to flow through resistor R4. This causes the capacitors C2 and C3 to charge in an extremely linear manner.

The voltage developed across capacitor C3 also appears across the series connected potentiometer R8 and resistors R9 and R10 which form a potential divider circuit to impress a portion of the total voltage across these series connected resistors upon the base electrode of transistor Q3. Transistor Q3 is connected in such a manner as to be normally in cut-off state. The time, or moment at which transistor Q3 is driven into saturation is determined by the rate at which the series connected capacitors C2 and C3 charge.

The collector electrode of transistor Q3 is connected through the parallel connected elements R13 and C5 to the base electrode of transistor Q4 which operates as an amplification stage with the output taken from the collector of transistor Q4 and appearing at the output terminal 211, being inverted and amplified relative to the collector output of transistor Q3.

The operation of the flyback timing circuit of FIGURE 13 is as follows:

At time $t_0$, an input is impressed at terminal 210*a*. The input level (or A.C. input pulse) is positive relative to the voltage level on bus 212, causing transistor Q1 to be driven into saturation. This causes the capacitors C2 and C3 to discharge instantaneously through transistor Q1 so that the voltage level between the base electrode of transistor Q2 and bus 28 is approximately 2.6 volts. This occurs due to the fact that the Zener diode CR1 is chosen to have a rating of substantially 2.6 volts.

When this input signal level is removed, the transistor Q1 is immediately driven into cut-off. The voltage at terminal 215, which is a common terminal between capacitors C2 and C3 is approximately −10 volts at this time. As soon as transistor Q1 is driven into cut-off, the capacitors C2 and C3 begin to charge in an extremely linear fashion. The voltage developed across capacitor C3 passes through the voltage divider comprised of potentiometer R8 and resistors R9 and R10.

By employing an adjustable potentiometer R8 it is possible to adjust the instant at which transistor Q3 will be driven into saturation from cut-off, thereby yielding an extremely easy and yet powerful means for varying the length of a time interval T. It has been found that through the use of the timing circuit 210, the timing interval is very simply and very accurately controllable within the limits from twelve seconds to as brief a time interval as a few microseconds. The use of first and second capacitors C2 and C3 in series connected fashion, as shown in FIGURE 13, helps to maintain an extremely linear charge build up across these capacitors, thereby yielding an extremely accurate circuit for "marking off" a time interval adjustable within extremely wide limits. The flyback timer circuit 210 of FIGURE 13 is extremely useful in marking off the duration of a bit interval and may thereby be used to great advantage in loading the register 140, shown in FIGURE 3 of the instant application.

The output 211 of flyback timer circuit 210 is impressed upon the input of D.C. amplifier 212 as shown in FIGURE 3, for the purpose of passing either the binary one or binary zero state of examined data bits through one of the respective AND gates 141 or 142 so as to be loaded into the first flip-flop stage 140*a* of the character register 140.

FIGURES 15*a*–15*h* each show a plurality of waveforms useful in describing the concept and operation of the instant invention. Turning first to FIGURE 15*a*, there is shown therein a waveform *a* which represents the phase modulated carrier frequency which has been modulated in accordance with one of the predetermined code formats. Vertical lines 301–304 indicate the time instant between the end of a data bit and the beginning of the next succeeding data bit. For example, three-bit intervals are identified between the lines 301–302, 302–303, and 303–304. The 180° phase shift can be clearly observed to occur right at the lines 301–304. Waveform *a* of FIGURE 15*a* indicates the output of the transmitter facility shown in FIGURE 2.

Waveform *b* represents the output at one of the difference amplifiers shown in the detector circuit of FIGURES 3 and 10. As was previously described, in the case where a difference amplifier has two sine waves impressed across the input terminals of the transformer primary winding, which sine waves are in phase synchronism, the output of the difference amplifier is substantially zero. In the case where the two sine waves impressed upon the input terminals of the transformer primary winding are 180° out of phase, this induces a sine wave output across the transformer secondary windings which is a sine wave of substantially the same frequency rate, but which has double amplitude of either of the two input sine waves. The diode members coupled across the secondary to the transformer comprising the difference amplifier cause the resultant sine wave of double amplitude to undergo full wave rectification generating half-cycles of the sine wave which are produced at a rate which is double the frequency of the system carrier frequency. Thus, each half-cycle constitutes a Nyquist interval. The double frequency full wave rectified output is then imposed upon a threshold amplifier as was previously described, causing the threshold amplifier circuit to yield an output represented by the waveform *b* of FIGURE 15*a*. Each of the square pulses within the bit intervals 301–302 and 303–304 constitutes a Nyquist interval. In the particular example given, it can be seen that each bit interval contains six Nyquist intervals, or three cycles of sine wave per bit interval.

Each Nyquist interval is imposed upon the staircase generator circuit shown in FIGURES 3 and 11 in order to charge the capacitor C3 of the staircase generator circuit 190. If the proper phase relationship is present during each Nyquist interval the capacitor C3 of the staircase generator will charge in a step-like fashion as represented by the waveform *c* of FIGURE 15*a*. The staircase generator threshold level established by its threshold circuit is identified by horizontal line 305, shown in FIGURE 15*a*. If, and when the voltage stored across capacitor C3 of the staircase generator circuit reaches or surpasses the preset threshold level 305, a binary one bit decision is generated by the threshold circuit. This is represented by the wavefrom *d* of FIGURE 15*a*. In the examples shown in FIGURE 15*a* it can be seen that, for the output of one difference amplifier, the voltage developed across the capacitor C3 of the staircase generator circuit surpasses the threshold level 305 for the data bits occurring within the bit intervals 301, 302 and 303, 304, generating the square pulses indicative of the fact that the bits under examination during these bit intervals have been identified as binary ones. This, of course, is based on the assumption that the particular difference amplifier being considered in the discussion of the curves of FIGURE 15*a* are to be identified as binary one data bits.

Figure 15B:
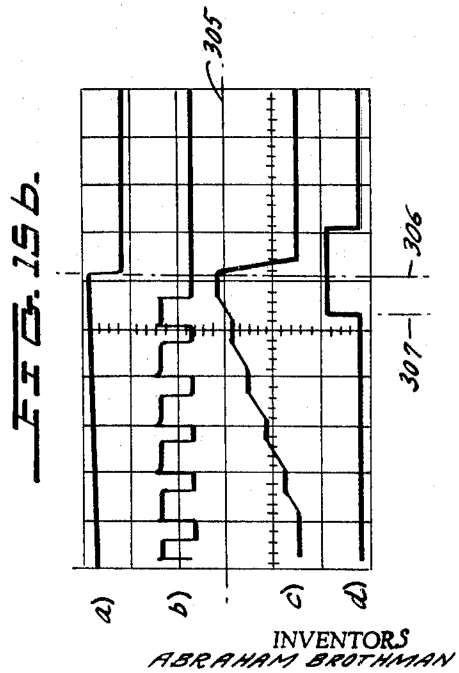

Turning now to FIGURE 15*b*, waveforms *b*, *c* and *d* portray substantially the same outputs as the waveforms *b*, *c*, and *d*, respectively, of FIGURE 15*a*. Waveform *a* of FIGURE 15*b*, however, represents a demodulated carrier. Vertical line 306 of FIGURE 15*b* represents the transition between the end of a first and the beginning of a second data bit interval. As was the case with FIGURE 15*a*, it can be seen that the bit interval between vertical lines 305 and 306 contains six Nyquist intervals. These Nyquist intervals charge the capacitor C3 of the staircase generator in the manner shown by the waveform *c* of FIGURE 15*b*. As can clearly be seen, the voltage developed across capacitor C3 of the staircase generator achieves the threshold level 305 of the staircase generator circuit at the time indicated by vertical line 307 just prior to the end of the data bit occurring at the time represented by vertical line 306 and identifies this bit, under examination, as being a binary one as shown by waveform *d* of FIGURE 15*b*.

In the examples of FIGURES 15*a* and 15*b* the waveforms shown therein are obtained during the transmission of data wherein no noise or other disturbance is present within the link. Turning to the group of waveforms shown in FIGURE 15*c*, waveform *a* shows a phase modulated carrier into which noise has ben deliberately injected in order to ascertain the effect of noise imposed upon the phase modulated carrier to a bit decision. The noise injected into the communications link can be seen to occur during the time intervals represented by the vertical lines 307, 308 and 309, 310.

Waveform *b* of FIGURE 15*c* shows the demodulated data bit train and the effect of noise imposed upon the link can clearly be seen to affect the quality of each received data bit. Waveform *c* of FIGURE 15*c* represents the voltage developed across capacitor C3 of the staircase generator circuit and its relationship to the threshold level represented by horizontal line 305. As can clearly be seen from waveform *c* the effect of the random noise imposed into the communications link is such as to cause the voltage developed across the capacitor C3 of the staircase generator to fail to achieve or pass the threshold level 305 so as to fail to identify all data bits received until the time represented by vertical line 311 as being binary one. At the time represented by vertical line 311, the voltage developed across the capacitor C3 of the staircase generator circuit reaches and slightly surpasses the threshold level 305, causing the presence of a binary one bit to be indicated as shown by the square pulse of waveform *d* shown in FIGURE 15*c*. It can be seen from the waveforms *a* and *c* of FIGURE 15*c* that during the interval represented by vertical lines 309 and 310, that the noise present causes the transmitting synchronizer or dividing circuit shown in FIGURES 2, 3 and 5 to be reset to zero, causing the staircase generator in turn, to be reset so that the voltage level across capacitor C3 of the staircase generator during the interval between vertical lines 309 and 310 develops only slightly and resets rapidly in readiness for examination of the next bit. Thus, noise injected into the link, in addition to having a decided effect upon the voltage developed within the staircase generator, causes the transmitting synchronizer circuit 130 to cause its dividing count to be reset to zero which, in turn, resets the staircase generator circuit in readiness for receipt of the next bit and thereby prevents the output of the staircase generator to achieve the threshold level, causing the bit being received to be identified as being ambiguous or gray. Due to the extreme reliability requirements desired from the transfer trip system, it is advantageous to identify a bit as being gray or ambiguous in order not to mistakenly identify a receive pulse train as comprising a code format which is a code format other than that sent from the transmitting facility.

FIGURE 15*d* shows the effect upon the system of noise which is continuously present. Waveform *a* of FIGURE 15*d* shows a phase modulated carrier which, in turn, has a noise signal continuously present and superimposed on the modulated carrier. Waveform *b* of FIGURE 15*d* shows the Nyquist intervals which are developed at the output of one of the two difference amplifiers in detector circuit 170. It can clearly be seen that the continuous noise present on the link has a marked effect upon the Nyquist intervals. For example, regarding the Nyquist intervals developed during the bit interval extending from vertical line 312 to vertical line 313, it can be seen that the first square pulse or Nyquist interval 314 is narrower, i.e., of shorter pulse duration, than the Nyquist interval or square pulse 315. Also, it can be seen that instead of six Nyquist intervals being developed between the bit interval extending between vertical lines 312 and 313, a seventh Nyquist interval or square pulse 316 is generated.

As before, waveform *c* of FIGURE 15*d* represents the voltage developed across capacitor C3 of staircase generator circuit 190. It can be seen that the continuous noise injected into the link prevents the voltage developed across the staircase generator capacitor C3 from ever achieving the threshold level 305. Thus, the bit decisions represented by waveform *d* of FIGURE 15*d* indicates that no positive square pulses are generated by the staircase generator threshold circuit indicative of the fact that bits examined during the time interval represented by the waveform *a* of FIGURE 15*d* are too ambiguous to be clearly identified. As will be noted, the bit interval occurring between vertical lines 312 and 313 has noise on the link which is so prominent that the transmitter synchronizing circuit 130 shown in FIGURE 5, is caused to reset, resetting the staircase generator circuit at a time represented by the vertical line 318 causing the staircase generator to begin anew in developing a voltage across its charging capacitor C3 during the interval between vertical lines 318 and 313. The resetting of the transmitting synchronizer circuit and likewise, of the staircase generator circuit only serves to prevent the voltage developed within the staircase generator circuit from achieving the threshold level 305 to cause the bit examined during such an interval to be identified as ambiguous.

As a further example, considering the bit interval between vertical lines 313 and 319 of FIGURE 15*d*, it can be seen that the difference amplifier examining this bit interval fails to impose any Nyquist intervals upon the staircase generator so as to generate zero voltage upon the staircase generator circuit during this interval. This prevents the bit during this interval from being identified as ambiguous due to the fact that the zero threshold level 320, shown relative to waveform *c* of FIGURE 15*d* from being achieved. It should be understood that any voltage developed across the staircase generator which is greater than the zero threshold level 320, but less than the binary one threshold level 305, will be impressed upon the gray bits detector circuit 200 shown in FIGURE 12 to be identified as not binary one, but greater than binary zero and hence, ambiguous. This indication, as was previously described, causes a complete reset of the shift register memory.

Figure 15G:
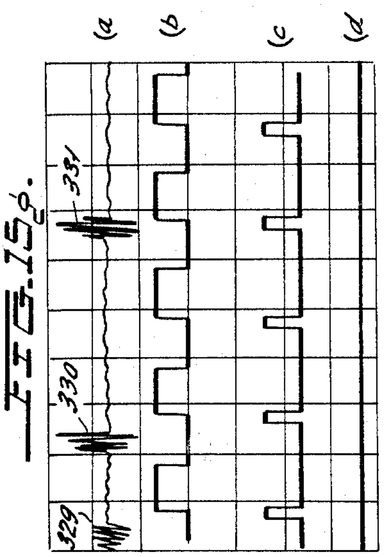
Figure 15H:
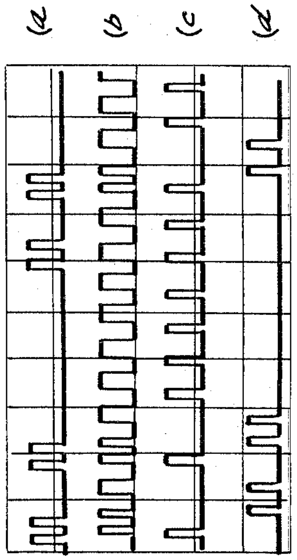
Figure 15E:
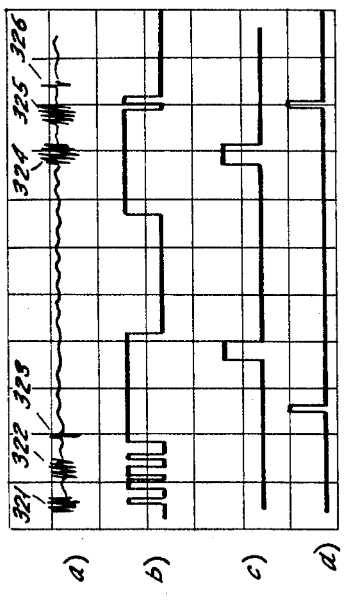

Turning to FIGURE 15*e*, waveform *a* shows a phase modulated carrier into which noise has been injected in a random fashion with the noise signals being present generally at 321–326, respectively, in waveform *a*. Waveform *b* shows a fully demodulated and detected data train. The effect of the noise imposed upon the link can clearly be seen by the irregular spacing and time durations of the square pulses within the data train. The bit decision generated by the staircase generator threshold circuit is represented by the waveform *c* and it can be seen that two of the train of binary data bits have been identified as being binary one. The error decisions are represented by waveform *b* and it can be seen that two bits have been identified as being errored as a result of the noise imposed upon the link.

Figure 15F:
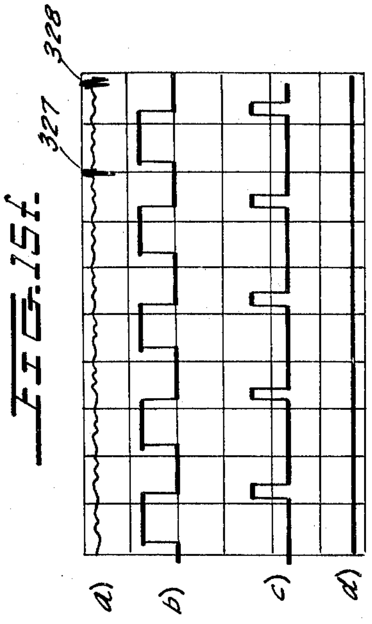

FIGURE 15*f* shows waveforms substantially similar to the waveforms *a–d* of FIGURE 15*e*, with the phase modulated carrier represented by waveform *a*, having only a very slight amount of random noise at 327 and 328. This noise had substantially no effect upon the data bit train shown by waveform *b* and it can be seen that each bit decision shown by waveform *c* indicates that each bit examined is a binary one. Waveform *d* represents the error decisions generated by the gray bits detector and it can be seen that no bits have been identified as being errored.

FIGURE 15*g* shows a substantially similar pattern to that of FIGURE 15*f* wherein the random noise within the phase modulated carrier represented by waveform *a* and occurring at 329, 330 and 331, has substantially no effect upon the bit stream represented by waveform *b* so that all bit decisions represented by waveform *c* identify all bits as being unambiguous binary ones with no error decisions occurring during this period as represented by waveform *d* of FIGURE 15*g*.

FIGURE 15*h* differs slightly from FIGURES 15*a*–15*g* in that waveform *a* represents noise which has been injected into the link in a random fashion as a plurality of impulses. The effect of these impulses upon the data bit train is shown by waveform *b*, the clear bit decisions are represented by waveform *c* of FIGURE 15*h*, while errored bit decisions are represented by waveform *d*.

It can clearly be seen from the foregoing that the instant invention provides a novel transfer trip system in which a code command format transmitted for either rest, test, or alarm conditions undergoes a very stringent examination during each Nyquist interval of a data bit in order to very clearly establish the oneness, zeroness, or grayness of examined bits. The requirements which each binary bit is to meet are so stringent as to cause a total reset of the receiver register memory upon the occurrence of a bit detected as being ambiguous so that a test, alarm or rest condition is not identified as being such at the receiver facility until the receipt of eight clear and unambiguous data bits within the pulse train has occurred. While the exemplary embodiment described herein employs a code comprised of eight binary bits, it should be understood that a fewer or greater number of bits may comprise a code and likewise, different code formats from those selected herein may be employed, depending only upon the needs of the user. The code formats selected herein have been done so for the purposes of simplicity in system circuitry and ease of distinguishing between and among the different codes, but such simplicity may be sacrificed if other factors are of greater importance to the user, thereby making the selection of the code and the number of bits within the code substantially flexible. The number of Nyquist intervals employed within any data bit may be regulated by selecting the number of full cycles of carrier within any given bit interval. In the examples of FIGURES *15a–15d*, six Nyquish intervals were employed indicating that each binary bit interval contains three full cycles of carrier. If desired, a greater or lesser number of full cycles of carrier may comprise each bit interval, thereby directly regulating the number of Nyquist intervals within a bit interval. If it is desired to have a greater number of full cycles per bit interval, while this affects the reliability of the system so as to diminish the probability of an error occurring, the effect of an increase in the number of full cycles per bit interval causes the bit rate to be diminished. As a still further example, diminishing the number of full cycles of carrier per bit interval causes an increase in the probability of an error occurring, but also causes the bit rate to be increased. The ultimate decision as to how many full cycles per bit interval should be selected is typically dependent upon the requirements of any given system and may be adjusted in any manner to suit the needs of the user. Regardless of the ultimate choice which may be made, the system has a reliability which constitutes very significant improvements over prior art devices, thereby yielding a very practical transfer trip system for use in protecting power networks which require an extremely high degree of reliability and accuracy.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A communications system operating at a selected carrier frequency comprising remotely located transmitter and receiver means; said transmitter means comprising first means for continuously generating an alarm code format; gate means normally inhibiting said transmitter means from transmitting said alarm code format and being energized by an alarm signal to activate said transmitter means; said receiver means comprising second means for receiving said alarm code format; register means coupled to said second means for storing said code format; third means coupled between said second means and said register means for completely resetting said register means when a data bit is identified as being ambiguous; logical gating means coupled to said register means for generating an output when said register means contains an unambiguous alarm code format.

2. The system of claim 1 wherein said third means is comprised of fourth means for generating first and second signals representative of the carrier frequency and its complement respectively; fifth means for comparing the alarm code format transmitted by said transmitter means with the first and second signals of said fourth means; sixth voltage storing means coupled to said fifth means for accumulating a voltage responsive to one output of said fifth means; first threshold means for generating an output when the voltage stored by said sixth means achieves a predetermined level; second threshold means connected to said sixth means for generating an output when the voltage stored by said sixth means fails to achieve said predetermined level for energizing said third means each time an examined bit is identified as being ambiguous.

3. The system of claim 2 further comprising storage means for temporarily storing the output of said first threshold means; timing means for marking off a bit interval; means connected between said register means and said storage means for loading the state of said storage means into said register means under control of said timing means.

4. The system of claim 2 further comprising storage means for temporarily storing the output of said first threshold means; timing means for marking off a bit interval; means connected between said register means and said storage means for loading the state of said storage means into said register means under control of said timing means; delay means coupled between said said timing means and said register means for shifting examined data bits into said register.

5. The system of claim 1 wherein said transmitter means is further comprised of a clock source; a multistage counter driven by said clock source; phase-shift transmitter means; gating means coupling the output of a first stage of said counter to said phase-shift transmitter means to modulate the system carrier frequency according to a first code format.

6. The system of claim 1 wherein said transmitter means is further comprised of a clock source; a multistage counter driven by said clock source; phase-shift transmitter means; gating means coupling the output of a first stage of said counter to said phase-shift transmitter means to modulate the system carrier frequency according to a first code format; manually operable fourth means coupled to said gating means for connecting the output of the second stage of said counter to said transmitter means and disconnecting said first stage output from said transmitter means to modulate the system carrier frequency according to a second code format.

7. The system of claim 1 wherein said transmitter means is further comprised of a clock source; a multistage counter driven by said clock source; phase-shift transmitter means; gating means coupling the output of a first stage of said counter to said phase-shift transmitter means to modulate the system carrier frequency according to a first code format; manually operable fourth means coupled to said gating means for connecting the output of the second stage of said counter to said transmitter means and disconnecting said first stage output from said transmitter means to modulate the system carrier frequency according to a second code format; fifth means responsive to an alarm signal being coupled to said gating means for connecting the output of a third stage of said counter to said transmitter means and disconnecting the output of said first and second stages from said transmitter to modulate the system carrier frequency according to a third code format.

8. The system of claim 7 wherein said third means is comprised of fourth means for generating first and second signals representative of the carrier frequency and its complement respectively; fifth means for comparing the code format transmitted by said transmitter means with the first and second signals of said fourth means; sixth voltage storing means coupled to said fifth means for accumulating a voltage responsive to output of said fifth means; first threshold means for generating an output when the voltage stored by said sixth means achieves a predetermined level; second threshold means connected to said sixth means for generating an output when the voltage stored by said sixth means fails to achieve said predetermined level for energizing said third means each time an examined bit is identified as being ambiguous.

9. The system of claim 1 wherein said logical gating means is further comprised of a third group of logical gates for generating an output when said third code format is fully loaded into said register; first and second storage means for storing the outputs of said first and second logical gate groups; the output of said third group of logical gates being connected to reset said first and second storage means when an output is generated by said third group of logical gates.

10. Transmitter means for use in a communications system operating at a selected carrier frequency and in which a plurality of predetermined code formats are employed to identify alarm, test and rest conditions respectively, comprising a clock source operating at the system carrier frequency rate; a counter connected to said clock source and having a plurality of flip-flop stages; phase-shift transmitter means for generating a phase modulated carrier; gating means coupled between said counter and said phase-shift transmitter means; first means responsive to an alarm signal controlling said gating means to couple the output of a first stage only of said counter to said phase-shift transmitter for modulating said carrier frequency according to a first code format; manually operable circuit means coupled to said gating means for connecting the output of a second counter stage only to said phase shift transmitter for modulating the carrier frequency according to a second code format; said gating means comprising means for coupling the output of a third stage only, of said counter to said phase-shift transmitter when said first means and said manually operable circuit means are deenergized.

11. Receiver means for use in a communications system operating at a selected carrier frequency and in which a plurality of predetermined code formats are transmitted to identify alarm test and rest conditions respectively, comprising first means for generating first and second outputs representing the system carrier frequency and its complement respectively, upon receipt of a transmitted code format; second and third means for comparing the modulated carrier with the first and second outputs respectively, of said first means, fourth and fifth means for full wave rectifying the outputs of said second and third means respectively; sixth and seventh threshold gate means for generating outputs when the outputs of said fourth and fifth means respectively achieve a first and second predetermined signal level; integrating means coupled to said sixth means for generating a voltage substantially linearly related to duration of the sixth means output; eighth threshold gate means for generating an output when said staircase generating means output achieves a third predetermined threshold; register means for storing the output of said eighth threshold gate means.

12. The receiver means of claim 11 further comprising ninth threshold gate means for generating an output when said staircase generating means voltage level is less than said third threshold level and achieves a fourth predetermined level; tenth means coupled to said ninth means for clearing said register means when said ninth means generates an output.

13. The receiver means of claim 11 further comprising counter means coupled to said first means; delay means coupled between said timing means and said timing means for resetting said timing means to initiate a timing interval at the beginning of each bit interval.

14. The receiver means of claim 11 further comprising logical gating means for generating an output when said register means is loaded with a unambiguous predetermined code format.

15. In a communications system having transmitter means operating at a particular carrier frequency in which any one of a plurality of predetermined code formats comprised of data bits are employed to modulate the system carrier frequency, each bit being transmitted as a predetermined number of intervals of said carrier frequency, receiver means comprising first means for receiving the modulated carrier; second means coupled to said first means for demodulating the modulated carrier; third means coupled to said first means for examining the number of said intervals in each data bit received; said third means being comprised of integrating means for generating a voltage representing the state of the total number of said predetermined intervals within the data bit being examined; fourth means coupled to said third means for generating an output when the voltage stored by said third means achieves a first predetermined level; and register means for storing the output state of said fourth means.

16. The receiver of claim 15 further comprising fifth means coupled to said third means for generating an output when the voltage stored by said third means is greater than a second predetermined level and less than said first predetermined level; sixth means coupled to said fifth means for clearing said register means when said fifth means generates an output.

17. The receiver of claim 16 further comprising seventh means responsive to said second means for marking off the time of a data bit; eighth means coupled to said seventh means for resetting said third means at the end of each data bit.

18. A system as set forth in claim 15 which includes means coupled to said third means for providing a reset signal to reset said register means responsive to detection of an ambiguous bit, and means coupled to said register means for generating an output only when said register means contains an unambiguous one of said code formats.

19. A system as set forth in claim 15, in which said register means comprises a shift register, and said fourth means includes means for providing a representative signal to said register means for each successive bit received, means controlled by said third means for resetting said register means when a data bit is identified as being ambiguous, and means coupled to said register means for generating an output only when an unambiguous code format is shifted into predetermined positions in said shift register.

20. A communications system operating at a selected carrier frequency comprising remotely located transmitter and receiver means; said transmitter means comprising phase shift transmitter means, first generator means for modulating each carrier frequency to provide a plurality of different code formats, each of which codes is comprised of a plurality of data bits, each data bit being comprised of a preselected number of predetermined intervals of said carrier frequency; said receiver means comprising second means for receiving said code formats; register means coupled to said second means for storing said code format; third means coupled between said second means and said register means including means for examining each received data bit of a code for said intervals, and means for completely resetting said register means when one data bit is identified as being ambiguous; and logical gating means coupled to said register means for generating an output only when said register means contains an unambiguous code format.

21. The system of claim 20 wherein said transmitter means is further comprised of a clock source, a multi-stage counter driven by said clock means, and means for selectively coupling different outputs of said counter to said phase shift transmitter means to modulate the system carrier frequency in correspondingly different code formats.

22. The system of claim 21 in which said logical gating means is comprised of a plurality of groups of logical gates, each of which is connected to generate an output for a different code format on said register means, and which includes first and second storage means for storing the outputs of first and second ones of said logical gate groups, and means connecting the output of a third logical gate group to reset said first and second storage means when an output is generated by said third logical gate group.

References Cited

UNITED STATES PATENTS

| | | | |
|---|---|---|---|
| 3,349,371 | 10/1967 | Brothman et al. | 340—146.1 |
| 2,828,362 | 3/1958 | Darwin et al. | 179—2 |
| 3,045,210 | 7/1962 | Langley | 340—147 |
| 3,245,040 | 4/1966 | Burdett et al. | 340—146.1 |

ROBERT L. GRIFFIN, *Primary Examiner.*

JOHN W. CALDWELL, *Examiner.*

J. TERRY STRATMAN, *Assistant Examiner.*